(12) United States Patent
Aarnio et al.

(10) Patent No.: US 10,590,615 B2
(45) Date of Patent: Mar. 17, 2020

(54) ORTHOTROPIC DECK

(71) Applicant: Vigor Industrial LLC, Portland, OR (US)

(72) Inventors: Terrance J. Aarnio, Milwaukie, OR (US); Keith Chapman, Milwaukie, OR (US); Bill Crittendon, Estacada, OR (US); Thomas J. Hickman, Canby, OR (US); Daniel Miller, Estacada, OR (US); Christopher Palmer, McMinnville, OR (US); Perry Royland, Tigard, OR (US); Vern Taute, Gaston, OR (US); David Ward, Eagle Creek, OR (US); Oded Maman, Portland, OR (US)

(73) Assignee: Vigor Industrial LLC, Portland, OR (US)

( * ) Notice: Subject to any disclaimer, the term of this patent is extended or adjusted under 35 U.S.C. 154(b) by 167 days.

(21) Appl. No.: 15/214,286

(22) Filed: Jul. 19, 2016

(65) Prior Publication Data

US 2017/0370054 A1    Dec. 28, 2017

Related U.S. Application Data

(60) Provisional application No. 62/355,778, filed on Jun. 28, 2016.

(51) Int. Cl.
*E01D 19/00* (2006.01)
*E01D 19/12* (2006.01)
(Continued)

(52) U.S. Cl.
CPC ............ *E01D 19/125* (2013.01); *B23K 31/02* (2013.01); *E01D 19/00* (2013.01); *B23K 2101/006* (2018.08); *B23K 2101/18* (2018.08)

(58) Field of Classification Search
CPC .. E01D 19/125; B23K 31/02; B23K 2201/18; B23K 2201/006; B64C 1/12
See application file for complete search history.

(56) References Cited

U.S. PATENT DOCUMENTS 2,431,971 A * 12/1947 Thompson ............... B21D 7/08
                                                        72/128
4,294,440 A * 10/1981 Severt ................ B23K 37/0461
                                                        269/71
(Continued)

FOREIGN PATENT DOCUMENTS

| CN | 105171204 A | 12/2015 |
|---|---|---|
| JP | 2003 320474 A | 11/2003 |
| JP | 2011 101900 A | 5/2011 |

OTHER PUBLICATIONS

International Search Report and Written Opinion for corresponding PCT Application No. PCT/US2017/039560, dated Oct. 10, 2017.
(Continued)

*Primary Examiner* — Rick K Chang
(74) *Attorney, Agent, or Firm* — Klarquist Sparkman, LLP

(57) ABSTRACT

A method of manufacturing an orthotropic deck panel includes securing a rib member in a first fixture, beveling an edge surface of the rib member while the rib member is secured in the first fixture, and releasing the rib member from the first fixture, attaching the rib member to a deck plate, and attaching a floor beam to the rib member and the deck plate.

20 Claims, 23 Drawing Sheets

(51) Int. Cl.
*B23K 31/02* (2006.01)
*B23K 101/18* (2006.01)
*B23K 101/00* (2006.01)

(56) References Cited

U.S. PATENT DOCUMENTS

| | | | | |
|---|---|---|---|---|
| 4,709,435 A | * | 12/1987 | Stemler | E01D 19/125 |
| | | | | 14/73 |
| 4,831,675 A | * | 5/1989 | Nedelcu | E01D 19/125 |
| | | | | 14/6 |
| 4,877,939 A | * | 10/1989 | Duley | B23Q 35/128 |
| | | | | 219/121.76 |
| 6,364,250 B1 | | 4/2002 | Brinck et al. | |
| 8,529,172 B2 | * | 9/2013 | Buta | B23C 3/12 |
| | | | | 409/132 |
| 2010/0237195 A1 | | 9/2010 | Stephan | |
| 2010/0280648 A1 | | 11/2010 | Marsh et al. | |
| 2014/0318056 A1 | * | 10/2014 | Abugattas | E04B 5/40 |
| | | | | 52/223.6 |
| 2015/0294032 A1 | | 10/2015 | Lagally et al. | |

OTHER PUBLICATIONS

English translation of Chinese Publication No. CN 105171204 A.

* cited by examiner

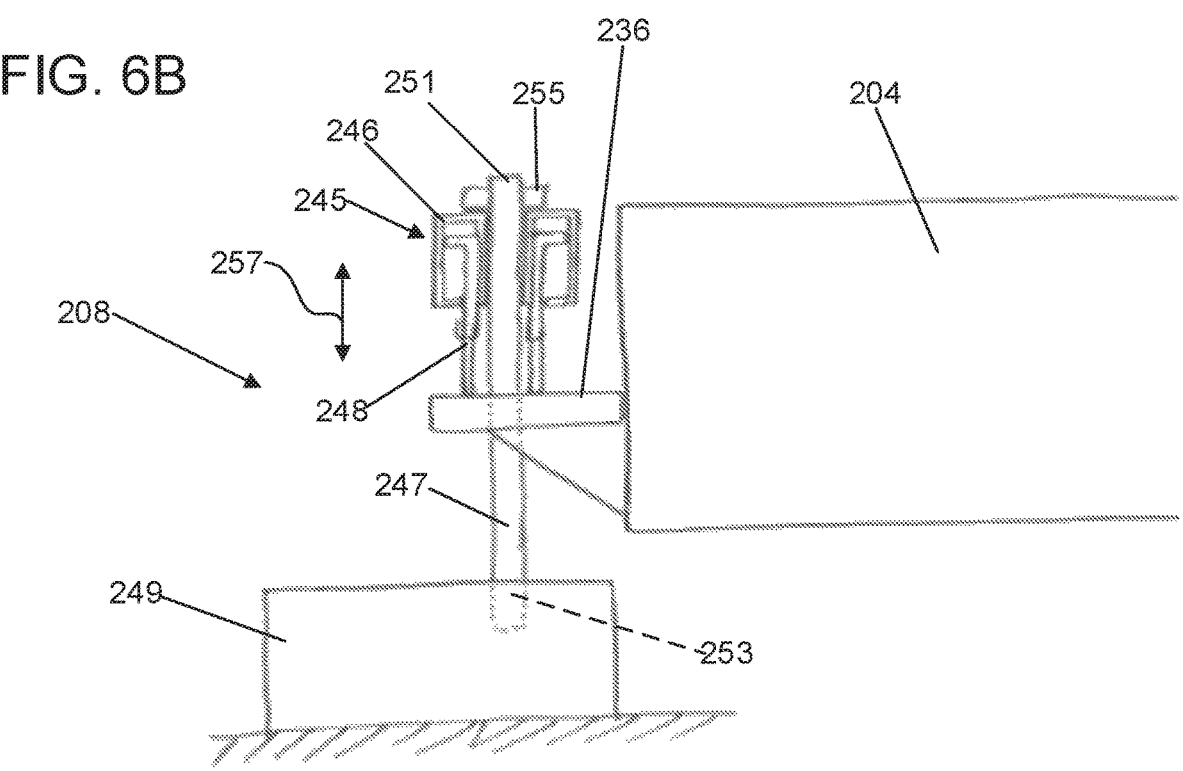

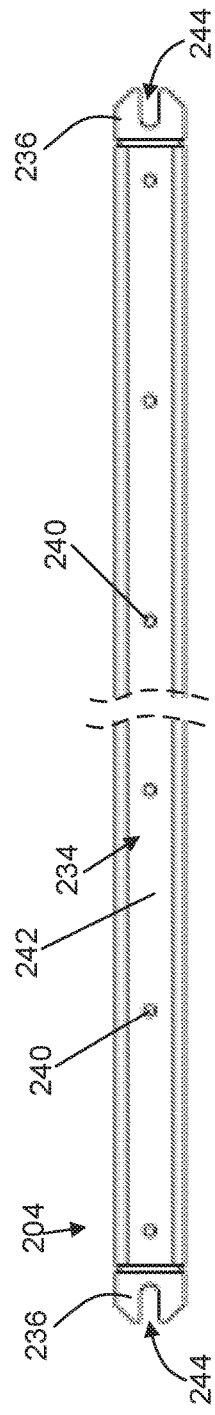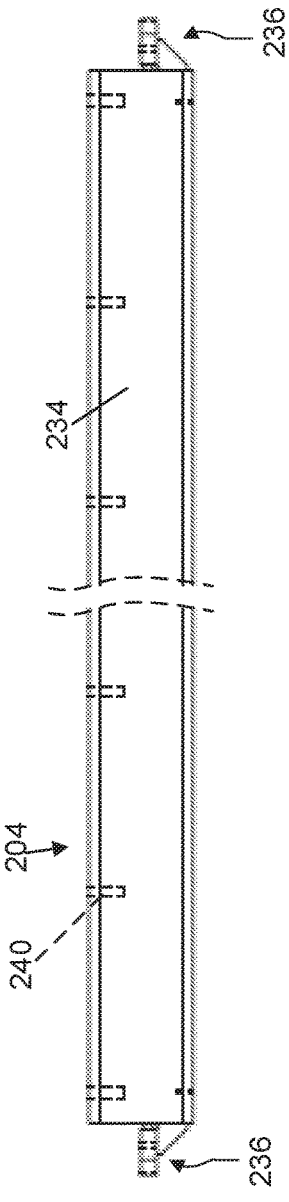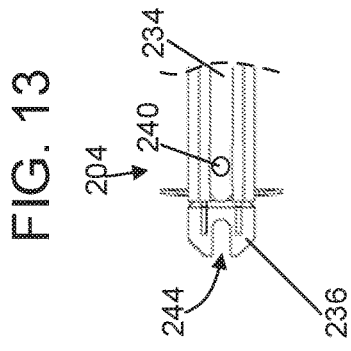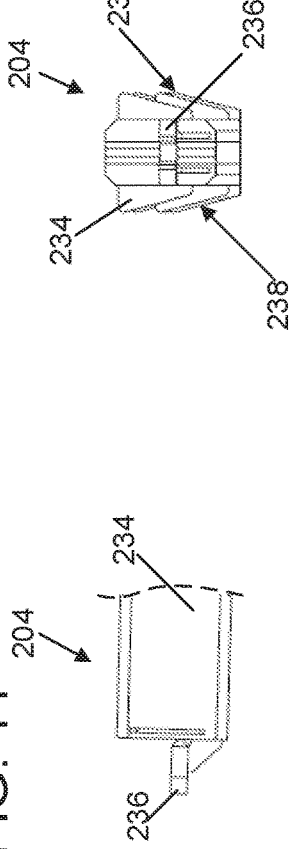

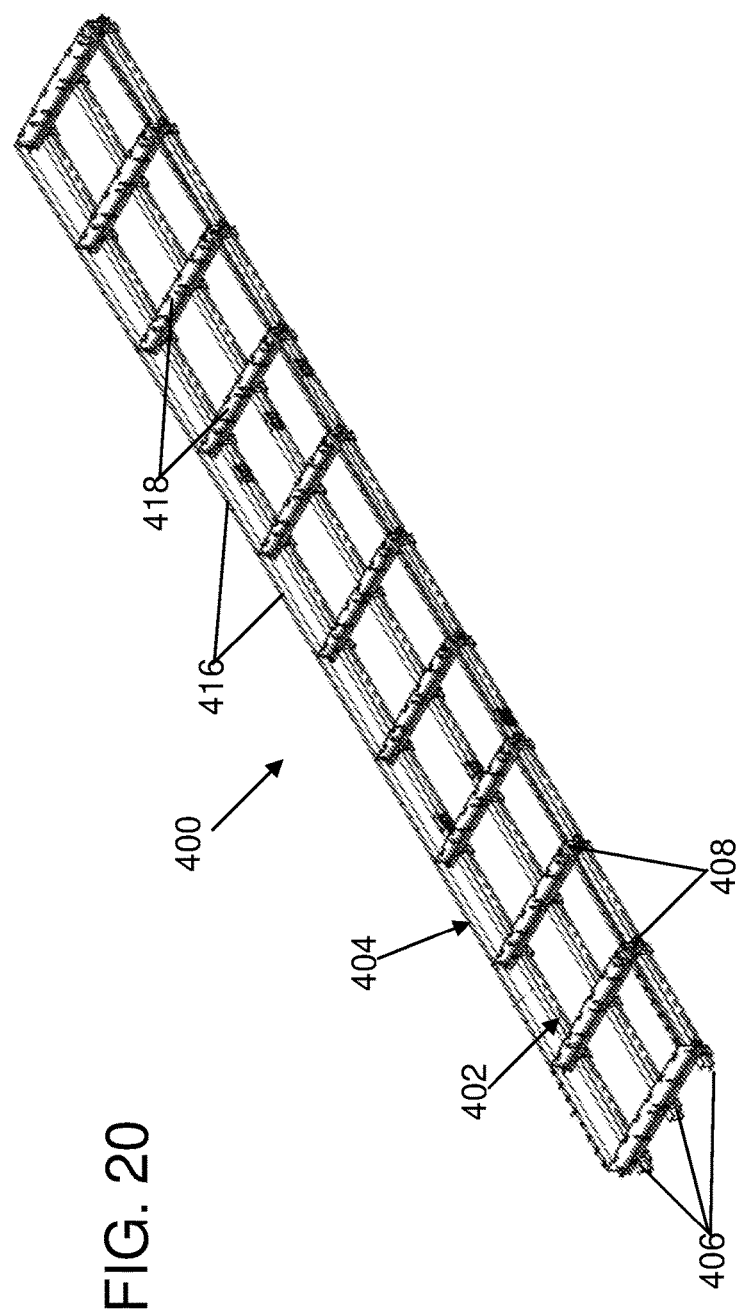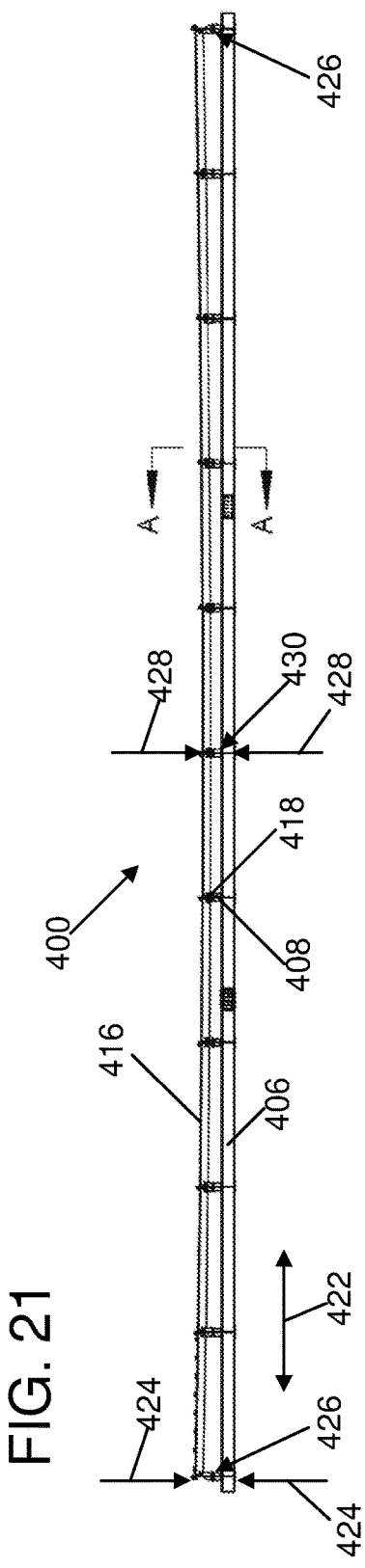
FIG. 20
FIG. 21

ORTHOTROPIC DECK

CROSS REFERENCE TO RELATED APPLICATION

This application claims the benefit of U.S. Provisional Application No. 62/355,778, filed Jun. 28, 2016, which is incorporated by reference herein in its entirety.

FIELD

The present disclosure is directed to orthotropic decks, as well as methods for their manufacture.

BACKGROUND

Orthotropic decks are used in a variety of applications, including bridges. Improvements in the design and manufacture of orthotropic decks can improve the strength, durability, and quality of orthotropic decks and can improve the ease and efficiency of the manufacturing process. Such improvements are therefore always desirable.

SUMMARY

Described herein are embodiments of orthotropic decks, as well as methods of manufacturing orthotropic decks.

In one representative embodiment, a method of manufacturing an orthotropic deck panel comprises securing a rib member in a first fixture, beveling an edge surface of the rib member while the rib member is secured in the first fixture, and releasing the rib member from the first fixture, attaching the rib member to a deck plate, and attaching a floor beam to the rib member and the deck plate.

In some embodiments, the method further comprises cambering the deck plate in a first direction and in a second direction using a second fixture prior to the act of attaching the rib member to the deck, wherein the second direction is transverse to the first direction. In some embodiments, the method further comprises securing the rib member against the deck plate with a plurality of third fixtures prior to the act of attaching the rib member to the deck, wherein the third fixtures are spaced relative to each other.

In some embodiments, the method further comprises creating a profile of the rib member and deck plate at a location, and cutting the floor beam to match the profile at the location, wherein the acts of creating a profile and cutting the floor beam occur prior to the act of attaching the floor beam. In some embodiments, the profile of the rib member and the deck plate is created using laser tracking.

In some embodiments, attaching the floor beam comprises tack welding the floor beam with the orthotropic deck panel in a first orientation, pivoting the orthotropic deck panel from the first orientation to a second orientation orthogonal to the first orientation, and welding the floor beam in continuous weld with the orthotropic deck panel in the second orientation.

In another representative embodiment, a method of manufacturing an orthotropic deck panel comprises cambering a deck plate in a first direction and in a second direction using a first fixture, wherein the second direction is transverse to the first direction, positioning a plurality of rib members on the deck plate, securing the positioning of the rib members relative to the deck plate with a plurality second fixtures, wherein the second fixtures are spaced relative to each other and distributed along the rib members, and welding the rib members to the deck plate.

In another representative embodiment, a method of manufacturing an orthotropic deck panel comprises attaching a plurality of rib members to a deck plate, creating a profile of the rib members and the deck plate at a plurality of locations spaced along the orthotropic deck panel, cutting a plurality of floor beams such that the floor beams include cut sections that correspond to the respective profiles of the rib members and the deck plate at the locations, and attaching the floor beams to the rib members and the deck plate.

The foregoing and other objects, features, and advantages of the invention will become more apparent from the following detailed description, which proceeds with reference to the accompanying figures.

BRIEF DESCRIPTION OF THE DRAWINGS

FIGS. 4-16 are various views the rib machining fixture and related components.

FIGS. 20-29 are various views of an exemplary embodiment of a cambering fixture and related components.

DETAILED DESCRIPTION

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms "a", "an" and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C" or "A, B and C."

As used herein, the term "coupled" generally means physically coupled or linked and does not exclude the presence of intermediate elements between the coupled items absent specific contrary language.

Described herein are embodiments of orthotropic decks, as well as methods of manufacturing orthotropic decks. The orthotropic decks described herein can be used, for example, on bridges, ferryboats, offshore platforms (e.g., oil and drilling rigs), and various other applications.

Figure 48:
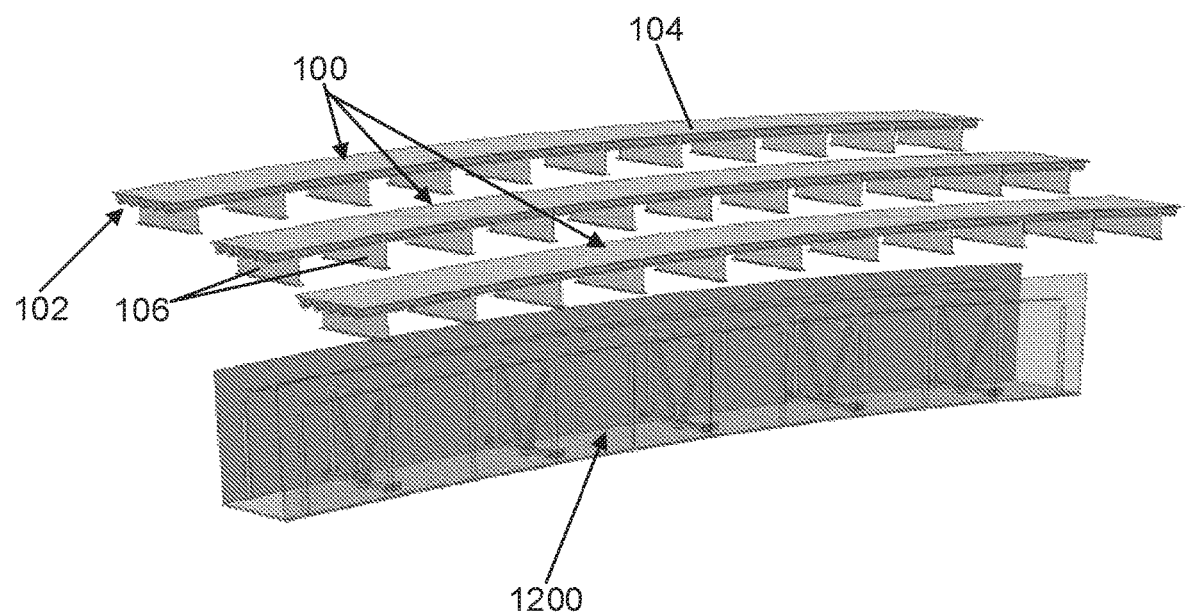
FIG. 48 is an exploded perspective view of three orthotropic deck panels and a girder.
Figure 49:
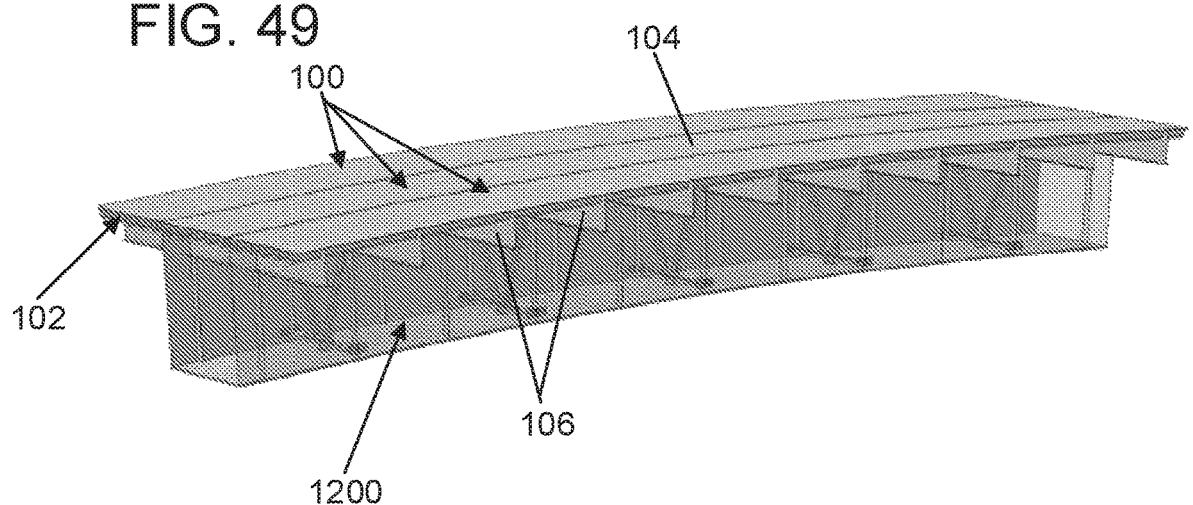
FIG. 49 is a perspective view of the three orthotropic deck panels attached to the box girder.

Orthotropic decks can comprise a plurality of deck panels that can be attached together and that can be further supported by additional structural members such as girders. For example, FIG. 48 shows three exemplary orthotropic deck panels 100 and an exemplary box girder 1200. FIG. 49 shows the three orthotropic deck panels 100 coupled together via the box girder 1200. It should be noted that in FIGS. 48-49 the box girder 1200 is shown as partially transparent in order to show an internal support structure of the box girder 1200.

Figure 1:
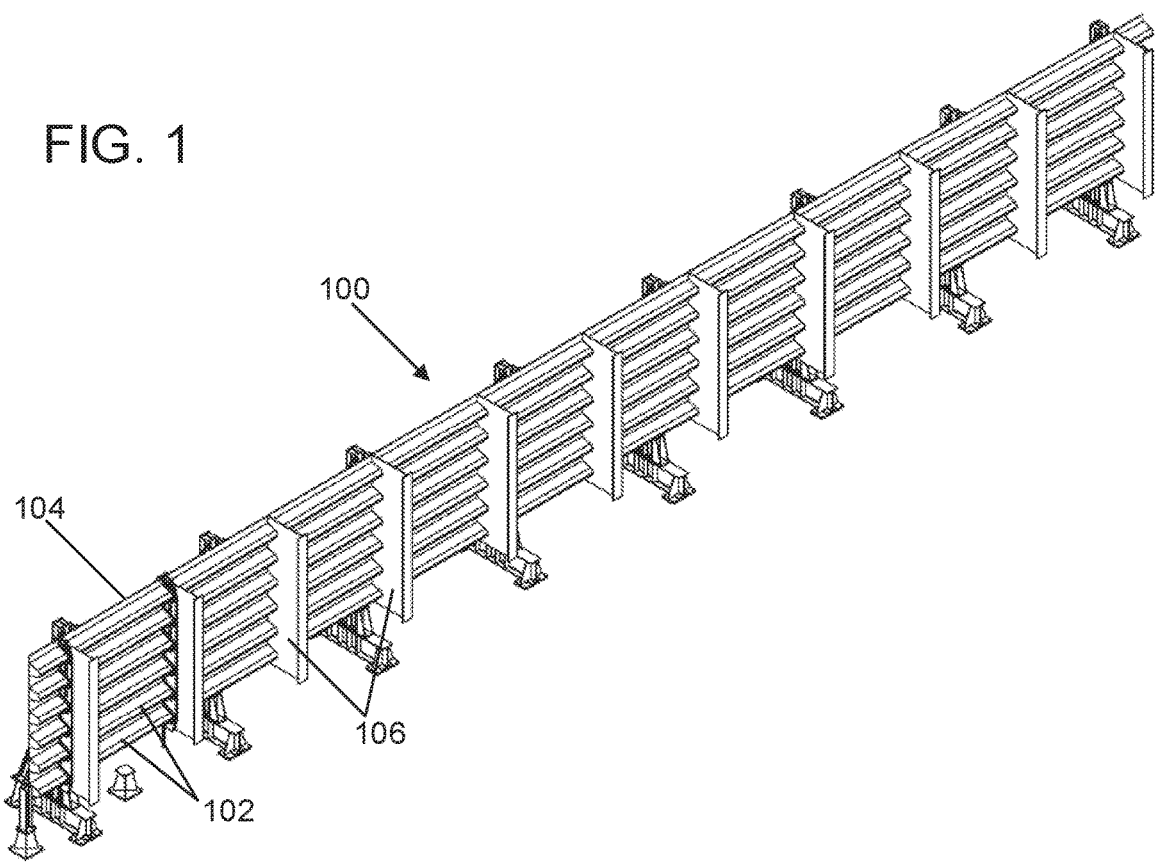
FIGS. 1-2 are perspective views of an exemplary embodiment of an orthotropic deck panel.
Figure 2:
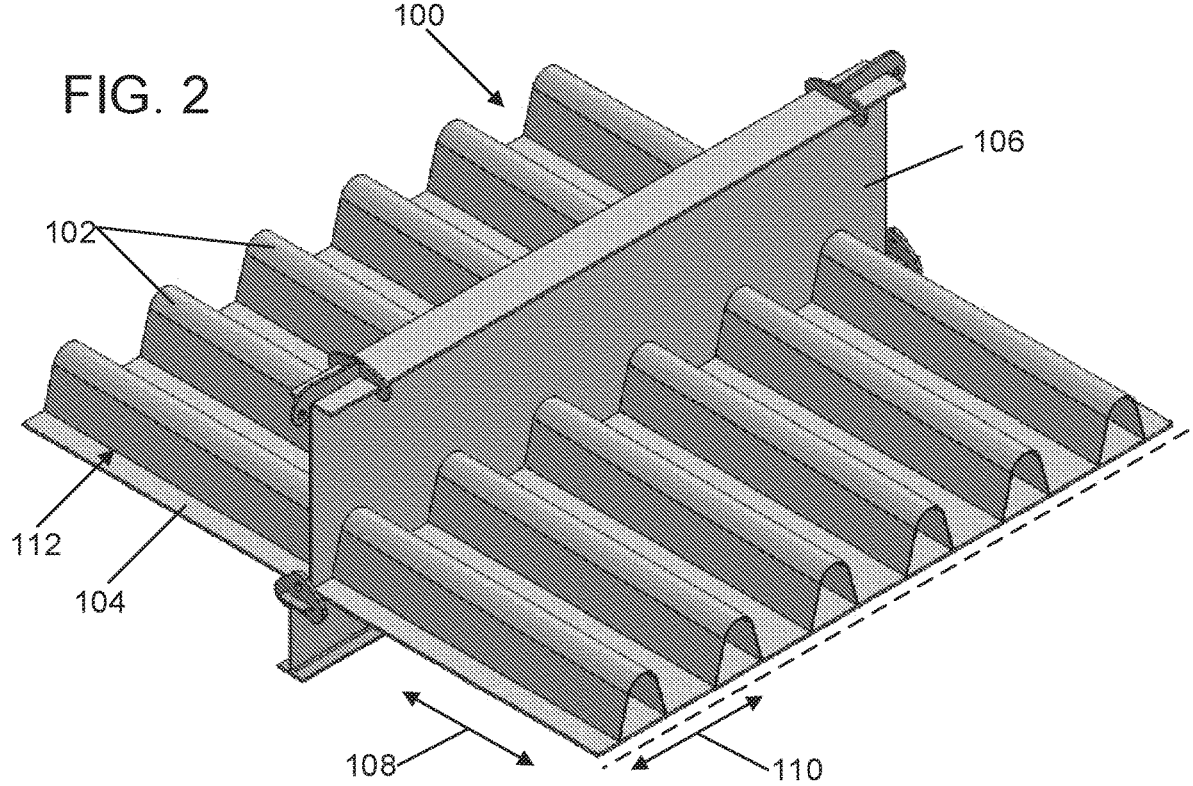

Referring to FIG. 1, the deck panel 100 comprises three main components: a plurality of ribs 102 (e.g., six in the illustrated embodiment), a deck plate 104, and a plurality of floor beams 106 (e.g., 11 in the illustrated embodiment). As best shown in FIG. 2, the ribs 102 can be spaced relative to each other and can extend in a longitudinal direction (i.e., the direction shown by arrow 108) relative to the deck plate 104. The floor beams 106 can be spaced relative to each other and can extend in a transverse direction (i.e., the direction shown by arrow 110) relative to the deck plate 104 and the ribs 102. The ribs 102, the deck plate 104, and the floor beams 106 can be fixedly secured together (e.g., welded), as further explained below.

The ribs 102 can be formed by bending a relatively flat sheet or plate of material into a rib (e.g., with a press) having a desired cross-sectional shape (taken in a plane perpendicular to a longitudinal axis of the ribs 102), including U-shaped, V-shaped, and trapezoidal. For example, in the illustrated embodiment, the ribs 102 comprise a U-shaped cross-sectional shape.

Figure 3:
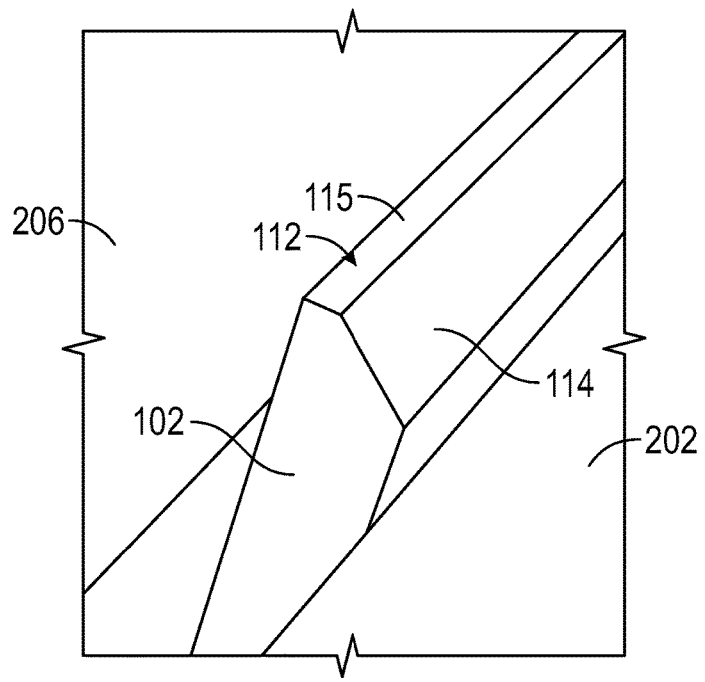
FIG. 3 is a detail view of a rib of the orthotropic deck panel and an exemplary embodiment of a rib machining fixture.

After the ribs 102 are formed in the desired shape, longitudinal edge portions 112 (i.e., the edges disposed against the deck plate 104 when the deck panel 100 is assembled) of the ribs 102 can be machined for fitting and attachment to the deck plate 104. For example, the machined edge portions 112 can include a beveled portion 114, as shown in FIG. 3.

Machining the edge portions 112 after forming the ribs 102 can, for example, provide a tighter fit between the ribs 102 and the deck plate 104 than ribs having edge portions that are machined prior to forming the ribs and ribs having edge portions that are ground after forming the ribs. This tighter fit, in turn, can advantageously improve the quality of a weld between the ribs 102 and the deck plate 104, resulting in a stronger and/or more durable deck panel 100. For example, in one particular embodiment, the root gap between the ribs 102 and the deck plate can be about 0.010 inches (0.25 mm) or less; whereas, the root gap of typical ribs and deck plates can be about 0.020 inches (0.50 mm) or more.

Figure 4:
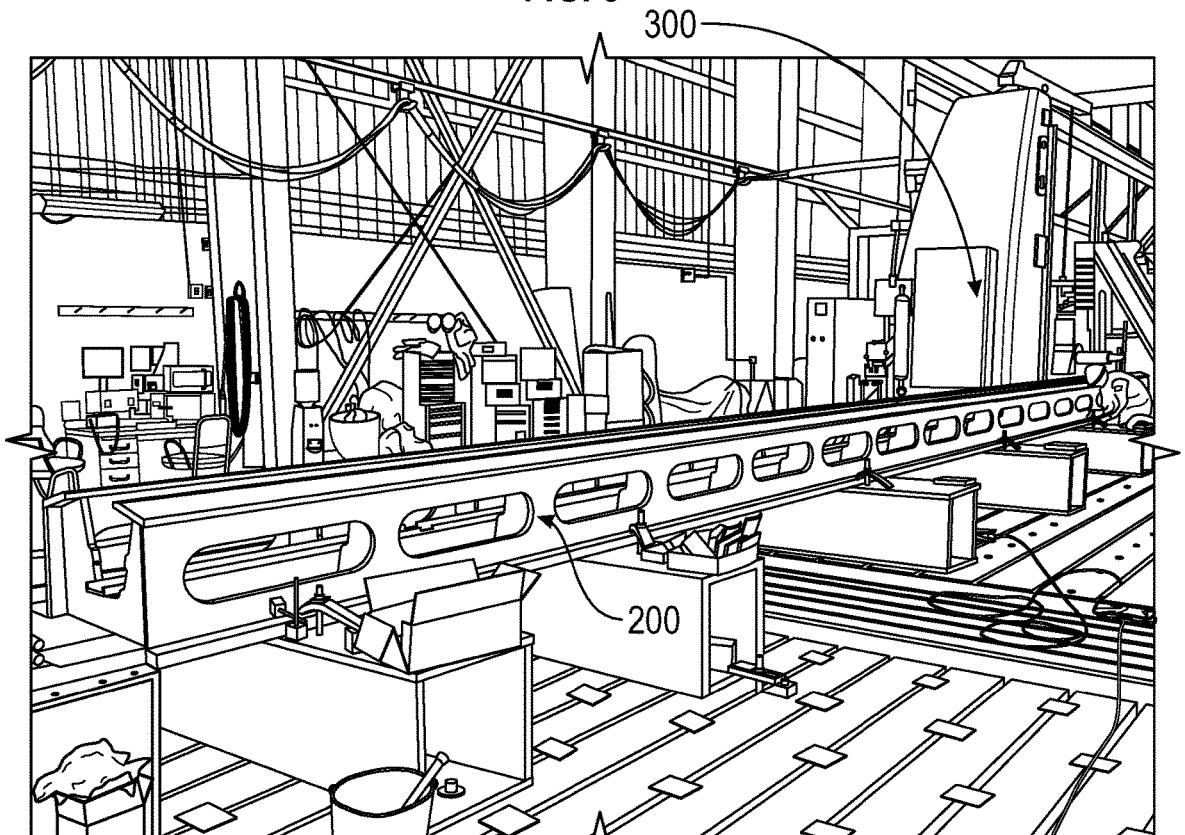
Figure 5:
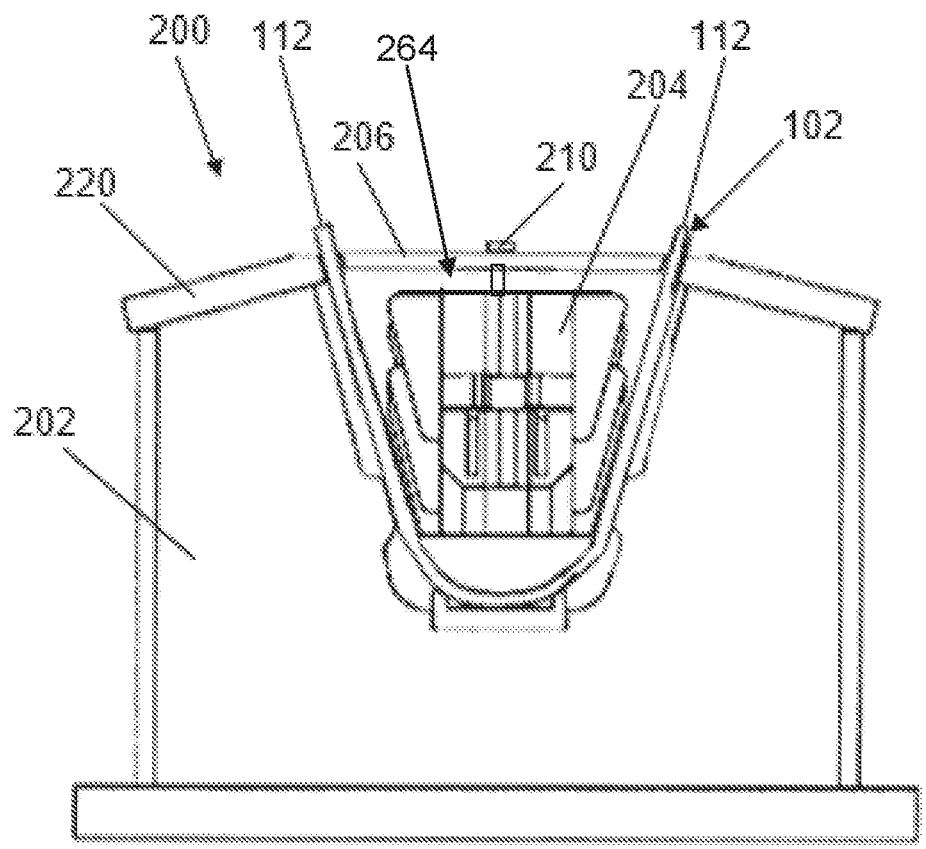
Figure 6A:
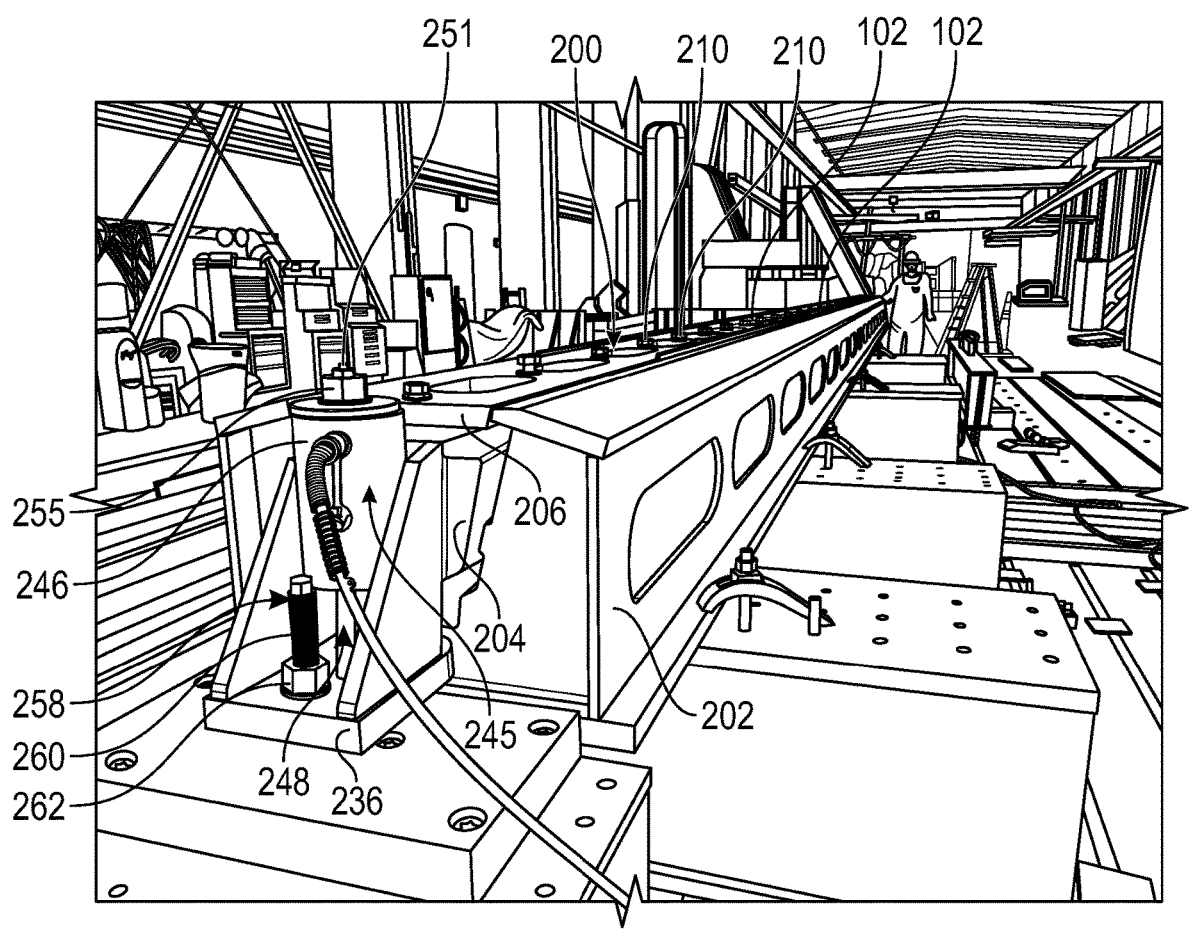

As best shown in FIG. 4, the edge portions 114 of the ribs 102 can be machined after the ribs 102 are formed by securing the ribs 102 in a rib machining fixture 200 and using a mill 300 to machine the edge portions 114 of the ribs 102. Referring to FIGS. 5-6, the rib machining fixture 200 can comprise four main components: a rib receiving member 202, a mandrel 204, a wedge plate 206, and compression assemblies 208 (FIGS. 6A-6B). The rib receiving member 202 can be adjustably coupled to the mandrel 204 by the compression assemblies 208, and the wedge plate 206 can be adjustably coupled to the mandrel 204 by a plurality of fasteners (e.g., bolts) 210.

Figure 7:
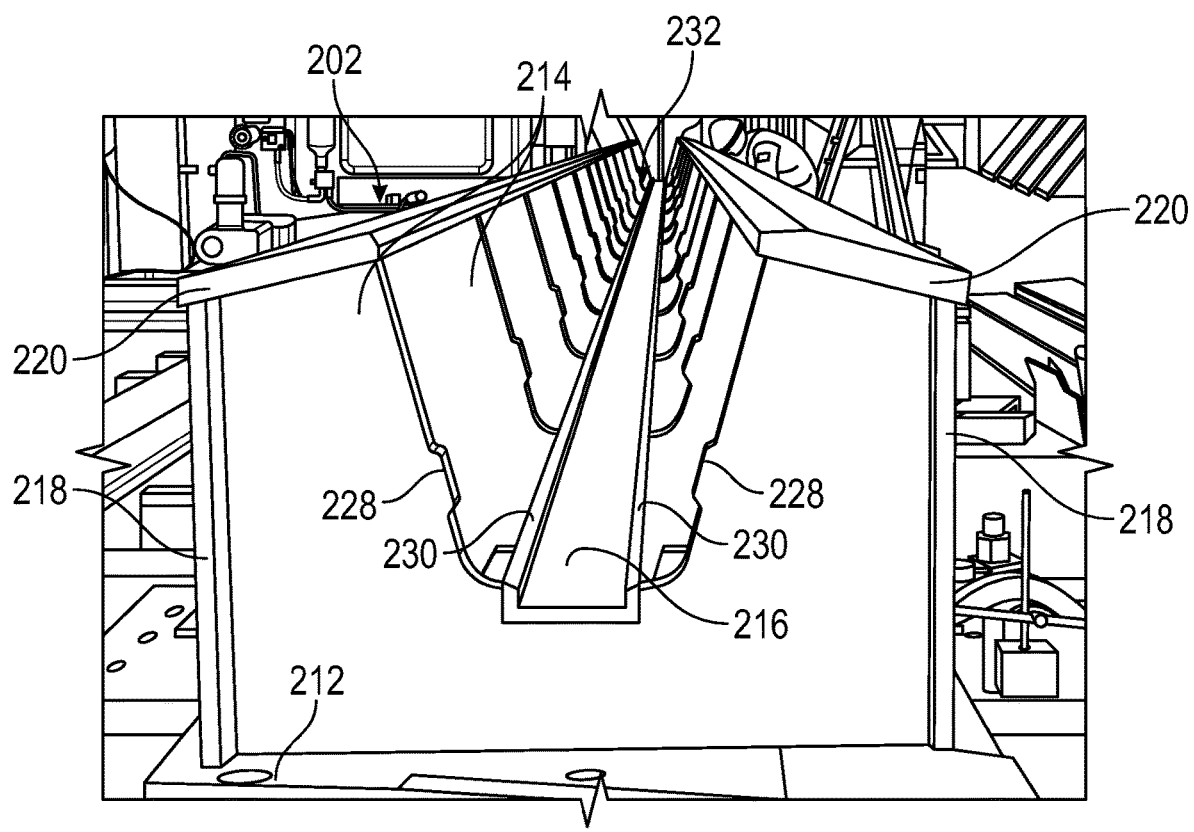
Figure 8:
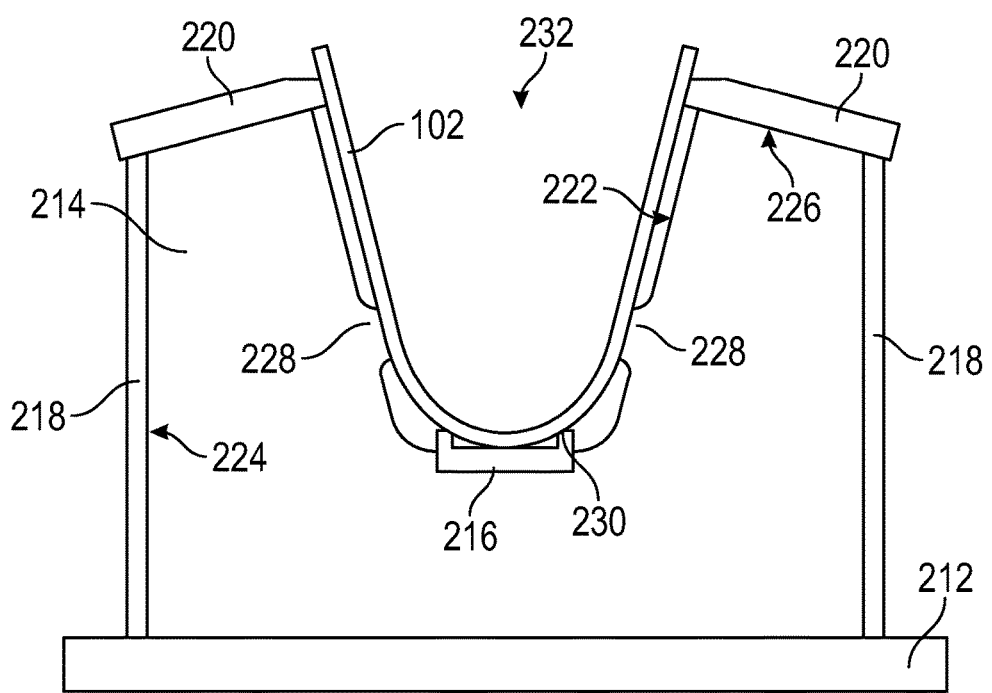

Referring to FIGS. 7-8, the rib receiving member 202 of the rib machining fixture 200 can comprise a base plate 212, a plurality of cradle plates 214, an interior plate 216, side plates 218, and top plates 220. The cradle plates 214 can be spaced relative to each other and fixedly secured (e.g., welded) to the base plate 202. The interior plate 216 can be fixedly secured to interior surfaces 222 of the cradle plates 214. The side and top plates 218, 220 can be fixedly secured to respective side and top portions 224, 226 of the cradle plates 214. The cradle plates 214 can comprise a plurality of projections 228 extending inwardly from the interior surfaces 222. The interior plate 216 can comprise a plurality of angled surfaces 230 that extend from and longitudinally along the interior plate 216 and are spaced relative to each other. In this manner, the rib receiving member 202 can form a longitudinally extending opening 232 configured to receive a rib 102 of the deck panel 100, as shown in FIG. 8.

Referring to FIGS. 9-13, the mandrel 204 of the rib machining fixture 200 can comprise a main portion 234 and connection portions 236 disposed at ends of the main portion 234. The main portion 234 can be an elongate beam-like member having angled side surfaces 238 that correspond to the interior surfaces 222 of the rib receiving member 202, as best shown in FIG. 12. The main portion 234 can also have a plurality of openings 240 formed in a top surface 242, as best shown in FIG. 9. The openings 240 can be configured to adjustably receive the fasteners 210 (FIG. 6) that extend through the wedge plate 206 and into the main portion 234 of the mandrel 204. In some embodiments, the openings 240 can comprise internal threads configured to engage corresponding external threads formed on the fasteners 210.

In some embodiments, the main portion 234 can also be cambered in the longitudinal direction, such that the main portion 234 initially contacts the rib 102 only in the center of the length of the main portion 234. Accordingly, as the main portion 234 is forced downward at the connection portions 236 at each end of the main portion 234, the pressure exerted by the mandrel 204 against the rib 102 is equalized along the length of the rib 102.

The connection portions 236 of the mandrel 204 can extend longitudinally away from end portions of the main portion 234 and can comprise openings (e.g., slots or holes) 244. In some embodiments, the connection portions 236 and the main portion 234 can be integrally formed from a single, unitary piece of material. In other embodiments, the connection portion 236 and the main portion 234 can be formed from separate pieces of material that are coupled together such as by welding and/or fasteners.

The slots 244 can be used to releasably connect the connection portions 236, and thus the main portion 234, of the mandrel 204 to one or more compression assemblies 208 (e.g., one compression assembly disposed adjacent each end of the mandrel 204 in the illustrated embodiment). Referring to FIGS. 6A-6B, in certain embodiments the compression assemblies 208 can each comprise a hydraulic ram 245, a connecting member 247, and a base member 249.

As best shown in FIG. 6B, the hydraulic ram 245 of the compression assembly 208 can comprise a cylinder portion 246 and a piston rod 248. The hydraulic ram 245 can also have a radially centrally disposed opening extending through the cylinder portion 246 and the piston rod 248.

Referring still to FIG. 6B, the connecting member 247 of the compression assembly 208 can comprise a first end portion 251 and a second end portion 253. The first end portion 251 of the connecting member 247 can be coupled to the cylinder portion 246 of the hydraulic ram 245, the connecting member 247 can extend through the opening of the hydraulic ram 245 and the opening 244 (FIG. 9) of the connection portion 236, and the second end portion 253 of the connecting member 247 can be coupled to the base member 249. In some embodiments, for example, the connecting member 247 can comprise a threaded shaft. In such embodiments, the first end portion 251 can be coupled to the cylinder portion 246 of the hydraulic ram 245 by a fastener (e.g., a nut) 255, and the connecting member 247 can be threadably coupled to the base member 249. As further explained below, the connecting member 247 can be configured such that the hydraulic ram 245 and the connection portion 236 are movable (e.g., in the direction shown by arrow 257 in FIG. 6B) relative to the connecting member 247.

The base member 249 of the compression assembly 208 can be fixed relative to the rib receiving member 202, as shown in FIG. 6A. As noted above, the base member 249 can also be fixedly coupled to the connecting member 247. For example, in some embodiments, base member 249 can comprise an opening comprising internal threads configured to engage corresponding external threads of the connecting member 247, as shown in FIG. 6B.

In this manner, when the hydraulic ram 245 is actuated such that the cylinder portion 246 and the piston rod portion move away from each other (e.g., in the direction shown by arrow 257), the cylinder portion 246 presses against the fastener 255, and the piston rod 248 slides along the connecting member 247 and presses against the connection portion 236 of the mandrel 204. This causes the connection portion 236 to slide along the connecting member 247 toward the base member 249. When the hydraulic ram 245 is actuated such that the cylinder portion 246 and the piston rod portion move toward each other (e.g., opposite the direction shown by arrow 257), the connection portion 236 can slide along the connecting member 247 away from the base member 249. As such, the compression assembly 208 can be used to secure a rib 102 relative to the rib machining fixture 200 as further describe below.

In some embodiments, the compression assembly 208 can also comprise a locking mechanism 258, as shown in FIG. 6A. The locking mechanism 258 can comprise a shaft portion 260 and a fastener 262. In some embodiments, the shaft portion 260 can be threaded and coupled to the base member 249 similar to the manner in which the connecting member 247 is connected to the base member 249. The shaft portion 260 can extend from the base member 249 and through the connection portion 236 of the mandrel 204. The shaft portion 260 can be movable relative to the connection portion 236 and can be adjustably coupled to the connection portion 236, for example, by the fastener (e.g., a nut) 262. In this manner, the connection portion 236 can slide along the shaft portion 260 when the mandrel 204 moves toward the base member 249. Once the mandrel 204 is desirable positioned relative to the base member 249 and thus the rib receiving member 202, the fastener 262 can be moved relative to the shaft portion 260 and the connection portion 236 such that the fastener 262 is secured tightly against the connection portion 236. As a result, the fastener 262 prevents the connection portion 236 and thus the mandrel 204 from moving relative to the base member 249, thereby locking the mandrel 204 in place relative to the rib receiving member 202, if pressure from the hydraulic ram 245 against the connection portion 236 is reduced and/or removed (e.g., due to bleed and/or intentional release).

Figure 14:
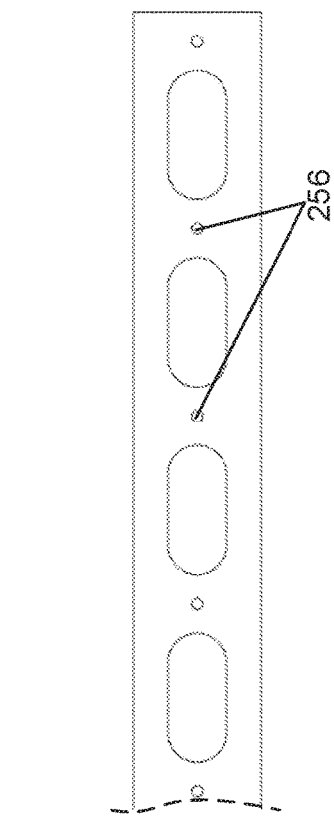
Figure 15:
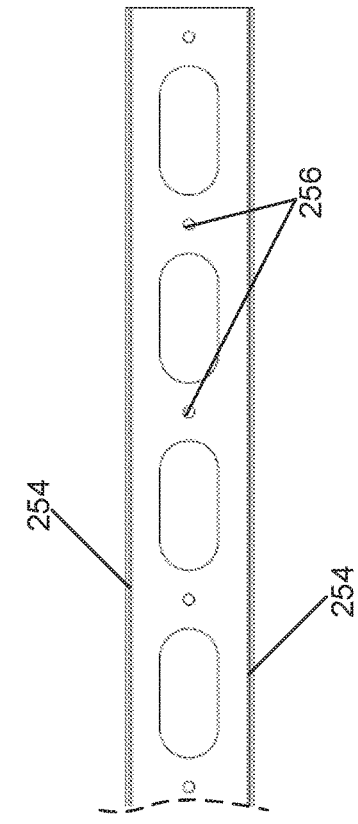
Figure 16:
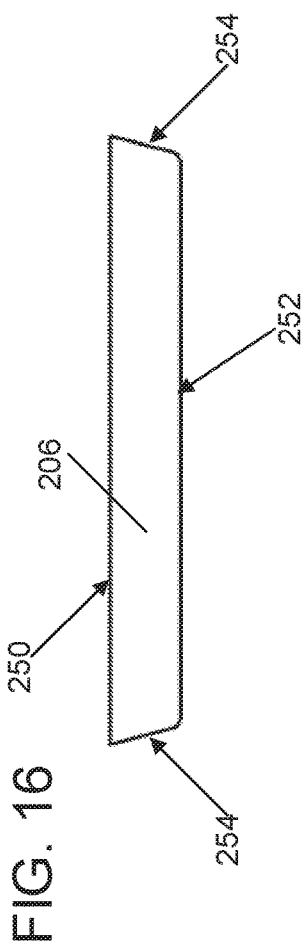

Referring to FIG. 14-16, the wedge plate 206 can comprise first and second surfaces 250, 252, and angled surfaces 254 configured in a trapezoid shape. The wedge plate 206 can also comprise a plurality of fastener apertures 256 extending through the wedge plate 206 from the first surface 250 to the second surface 252.

The rib machining fixture 200 can be used to releasably secure the ribs 102 of the deck panel 100 such that the ribs 102 are securely held in place and the edge portions 112 of the ribs 102 are exposed so that the edge portions 112 can be machined with precision. This can be accomplished, for example, by placing a rib 102 in the rib receiving member 202, as shown in FIG. 8. The rib 102 can be secured against the rib receiving member 202 by placing the mandrel 204 within the opening 232 (FIG. 8) of the rib receiving member 202, as best shown in FIG. 5. The connection portions 236 of the mandrel 204 can then be coupled to the compression assemblies 208, as shown in FIGS. 6A-6B. The hydraulic rams 245 of the compression assemblies 208 can be actuated such that the mandrel 204 moves toward the rib 102 and the rib receiving member 202 and presses the rib 102 against the rib receiving member 202, thereby clamping the rib 102 between the rib receiving member 202 and the mandrel 204. In embodiments with the locking mechanism 258, the locking mechanism 258 can be secured such that the mandrel 204 and thus the rib 102 cannot move relative to the rib receiving member 202.

The wedge plate 206 can then be attached and/or tightened against the rib 102 and/or the mandrel 102 by adjusting the fasteners 210. This clamps the rib 102 between the top plates 220 of the rib receiving member and the angled surfaces 254 (FIG. 16) of the wedge plate 206. As a result, the rib 102 is secured relative to the rib machining fixture 200, and the edge portions 112 of the ribs 102 are exposed. As shown in FIG. 5, in some embodiments, there can be a gap 264 between the wedge plate 206 and the mandrel 204. In such embodiments, the fasteners 210 can be adjusted such that the fasteners 210 draw the wedge plate 206 toward the mandrel 204 (e.g., by rotating the fasteners 210 in a first direction relative to the wedge plate 206 and the mandrel 204). This causes the angled surfaces 254 (FIG. 16) of the wedge plate 206 to apply pressure to the rib 102 and urges the edge portions 112 of the ribs 102 against the top plate 220 of the rib receiving member 202 in preparation for machining.

Figure 17:
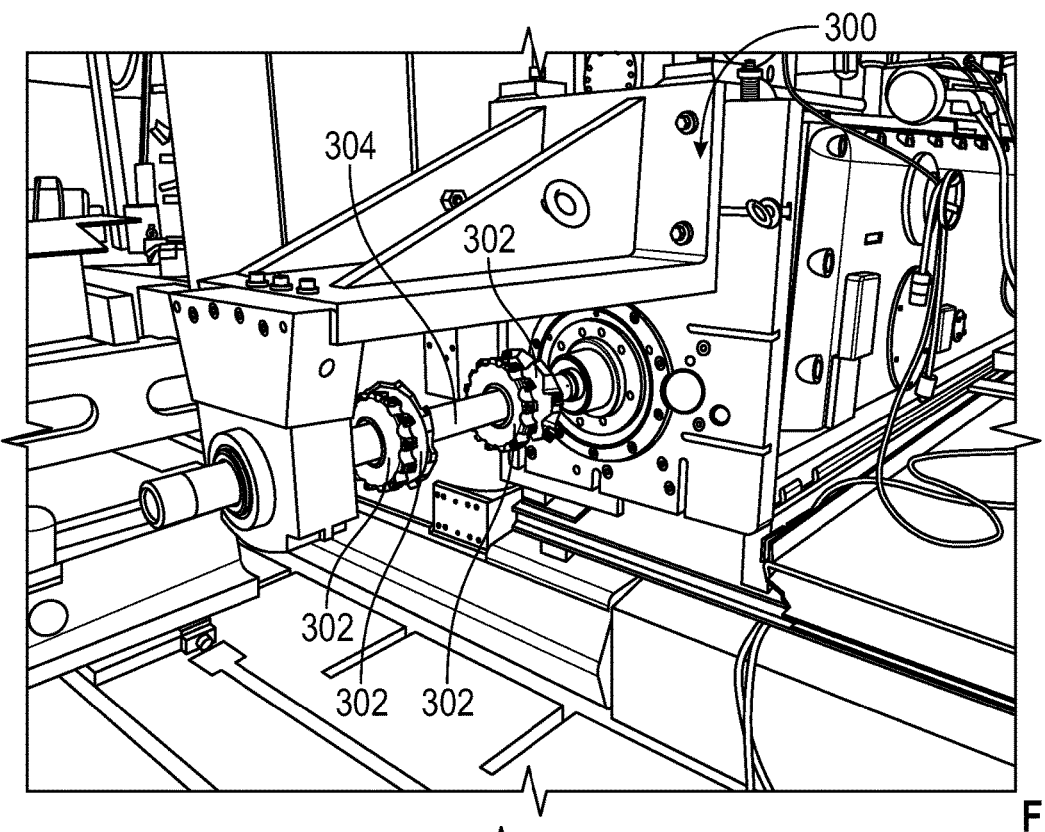
FIGS. 17-18 are perspective views of a mill configured for milling ribs of the orthotropic deck panel.
Figure 18:
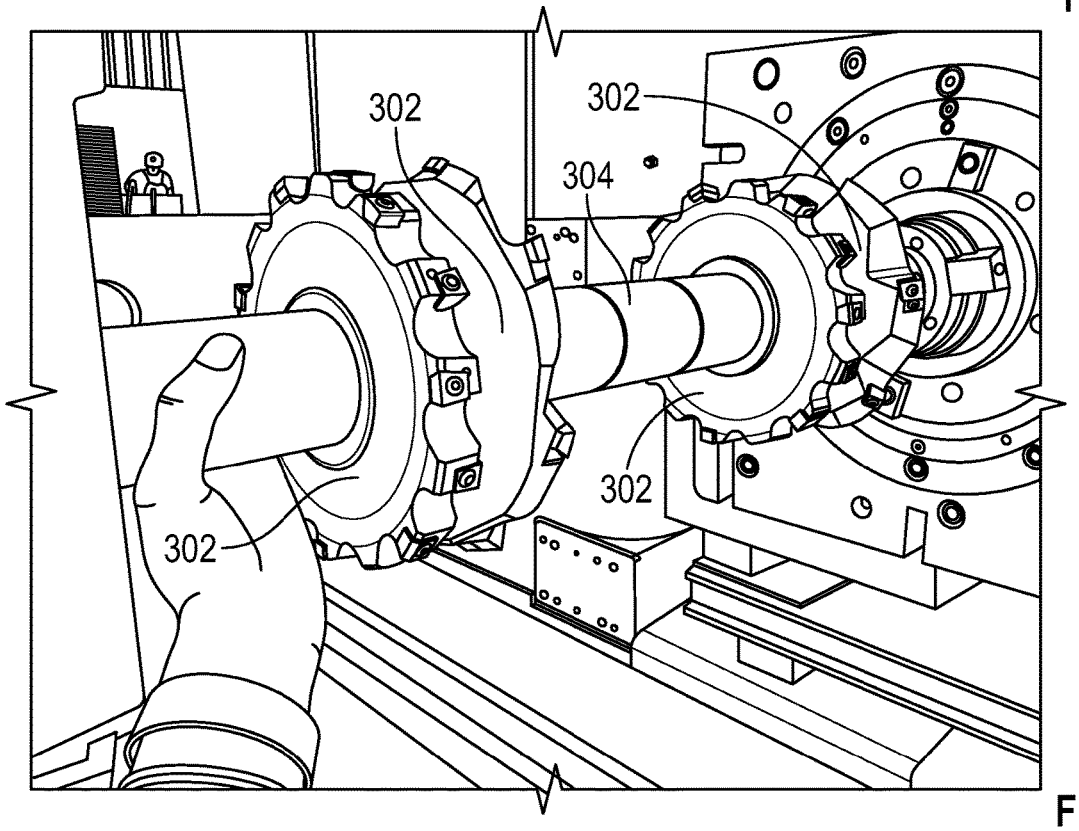
Figure 19:
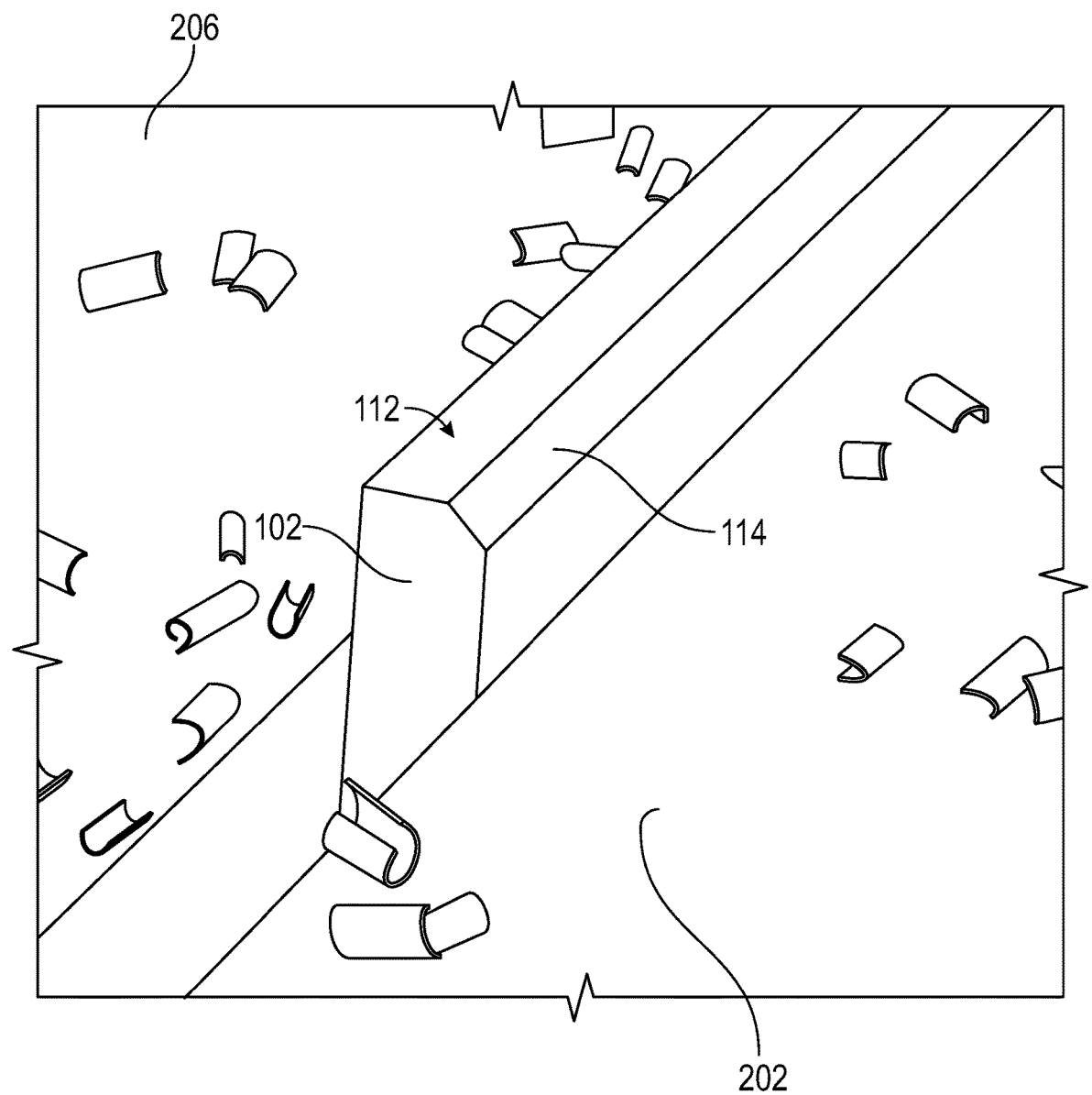
FIG. 19 is a detail view of the rib of the orthotropic deck panel and the rib machining fixture.

The edge portions 112 of the rib 102 can then be machined using the mill 300. As shown in FIGS. 17 and 18, multiple cutters 302 can be attached to an arbor 304 of the mill (sometimes referred to as "gang milling"). This configuration allows both of the edge portions 112 of the rib 102 to be milled with each pass of the mill. In this manner, the edge portions can be machined to desired specifications. For example, FIG. 19 shows the edge portions 112 after an initial pass of the mill 300, and FIG. 3 shows the edge portions 112 after a successive pass of the mill 300 after which both the beveled portion 114 and the flat portion 115 have been machined. The ribs 102 can then be attached (e.g., welded) to the deck plate 104, as further explained below.

Prior to attaching the ribs 102 to the deck plate 104, the deck plate 104 can be cambered in the longitudinal and/or transverse (also referred to as "cross-slope") directions. Cambering the deck plate 104 prior to attaching the ribs 102 to the deck plate can advantageously reduce and/or eliminate residual stress in tack welds that are used to initially attach the ribs 102 to the deck plate 104. As a result, the tack welds are much more likely to securely hold the ribs 102 to the deck plate rather than break just ahead of the robotic welder than tack welds that were formed prior to cambering the deck plate. This in turn improves the weld quality between the ribs 102 and the deck plate 104, and thus improves the strength and/or durability of the deck panel 100.

Figure 24:
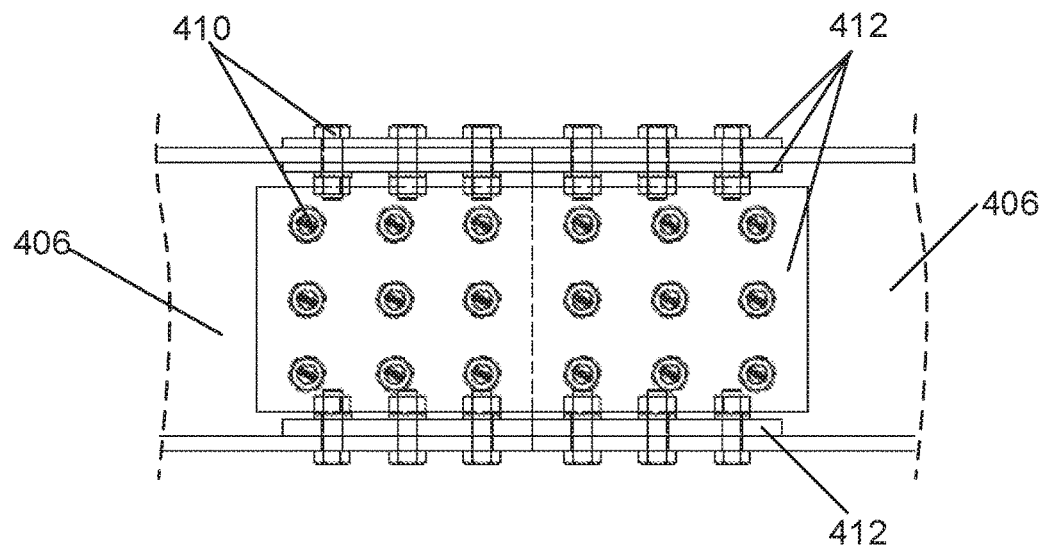
Figure 25:
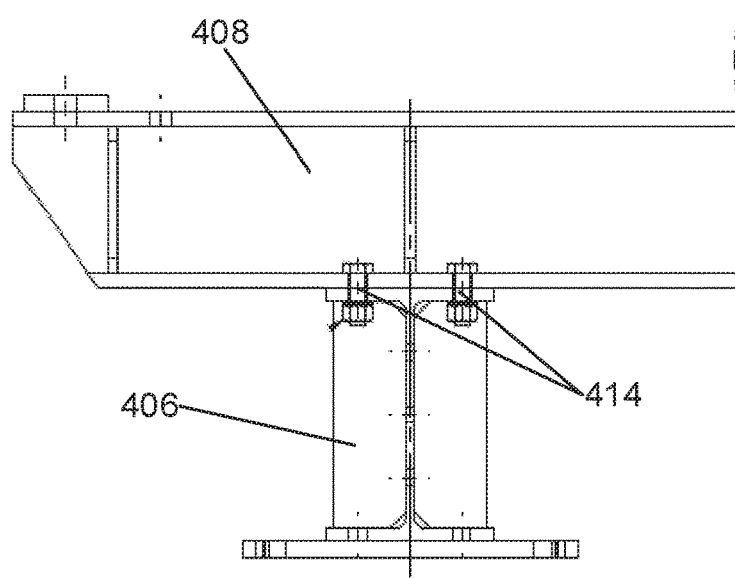

The deck plate 104 can be cambered with a cambering fixture 400, as shown in FIGS. 20-24. The cambering fixture 400 can comprise two main components: a support frame 402 (FIG. 23) and a deck plate support structure 404 (FIG. 26) disposed on the support frame 402. As best shown in FIG. 20, the support frame 402 can comprise a plurality of first beams 406 (e.g., nine in the illustrated embodiment, i.e., three rows each having three first beams 406) and a plurality of second beams 408 (e.g., 11 in the illustrated embodiment) disposed on and transverse relative to the first beams 406. The first beams 406 can be coupled together, for example, with a plurality of fasteners 410 and plates 412, as shown in FIG. 24. The second beams 408 can be coupled to the first beams 406, for example with a plurality of fasteners 414, as shown in FIG. 25.

Figure 26:
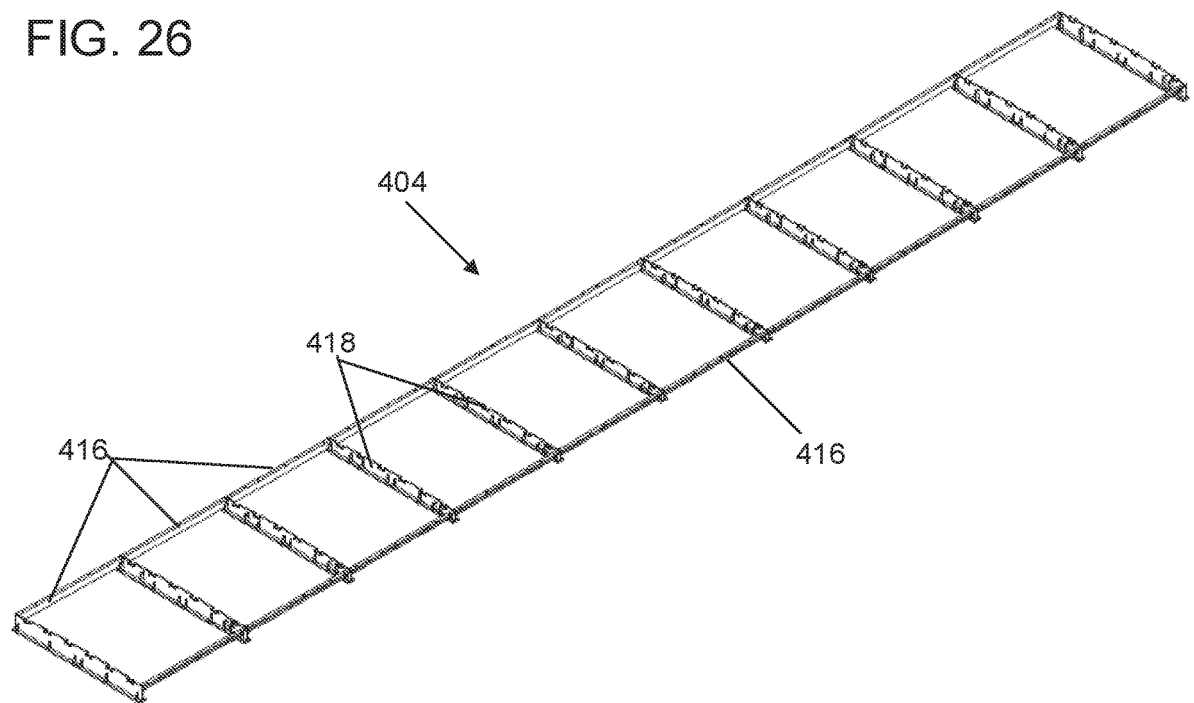
Figure 27:
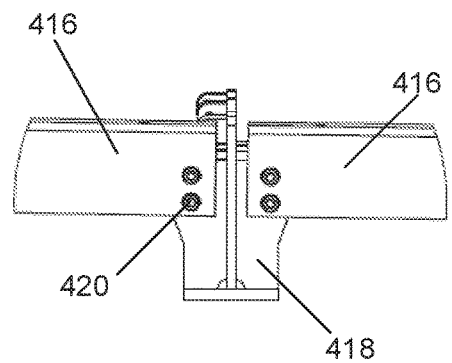

As best shown in FIG. 26, the deck plate support structure 404 can comprise a plurality of connecting members 416 (e.g. 20 in the illustrated embodiment, 10 on each side) extending longitudinally, and a plurality of cambering members 418 (e.g., 11 in the illustrated embodiment) spaced apart relative to each other and transverse relative to the connecting members 416. As shown in FIG. 20, the connecting members 416 can extend parallel to the first beams 406, and the cambering members 418 can extend parallel to the second beams 408. The connecting members 416 can be coupled together and to the cambering members 418, for example, with fasteners 420, as shown in FIG. 27.

Referring to FIG. 21, the cambering fixture 400 can be cambered in a first direction (e.g., the longitudinal direction shown by arrow 422) such that a first height 424 at end portions 426 of the cambering fixture 400 is greater than a second height 428 at an intermediate portion 430 (e.g., a center portion) of the cambering fixture 400. In other words, the cambering members 418 at end portions 426 of the cambering fixture 400 are the tallest cambering members 418, and the cambering members 418 get progressively shorter toward moving inwardly from the end portions 426. In this manner, the connecting members 416 form a slight U-shaped curve when viewed from a side of the cambering fixture 400, as illustrated in FIG. 21.

Figure 22:
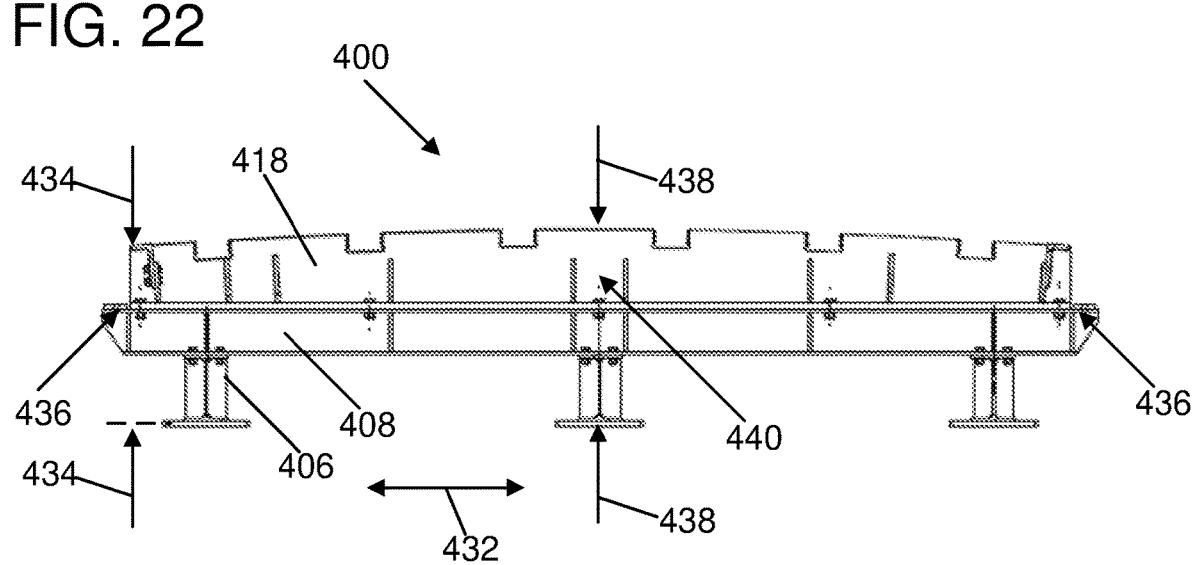
Figure 23:
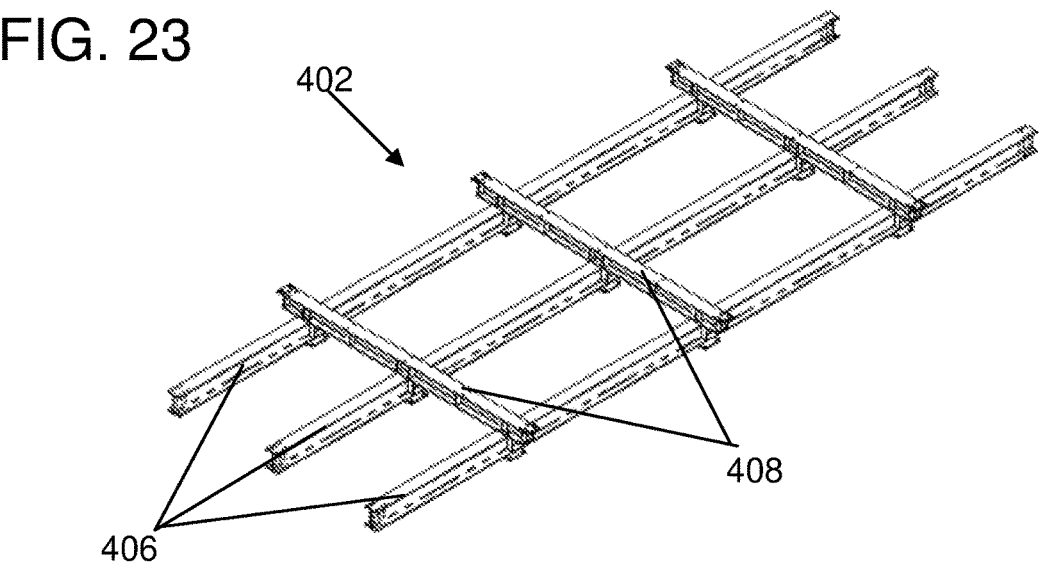

Referring to FIG. 22, the cambering fixture 400 can be cambered in a second direction (e.g., the transverse direction shown by arrow 432 such that a third height 434 at side portions 436 of the cambering fixture 400 are less than a fourth height 438 at an intermediate portions 440 (e.g., a center portion) of the cambering members 418. In this manner, the cambering members 418 form a slight upside-down U-shaped curve when viewed from an end portion of the cambering fixture 400, as illustrated in FIG. 22.

Figure 28:
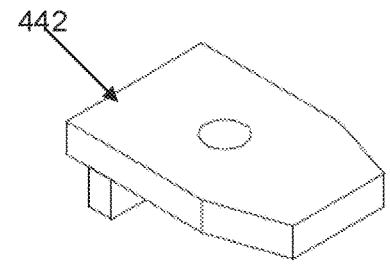
Figure 29:
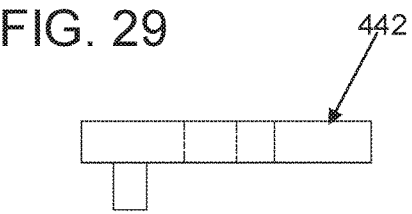

The deck plate 104 of the deck panel 100 can be disposed on the connecting members 416 and/or the cambering members 418 of the cambering fixture. The deck plate 104 can be releasably secured to the cambering fixture 400 such that the deck plate 104 assumes the cambered configuration of the cambering fixture 400. In some embodiments, the deck plate 104 can be releasably secured to the cambering fixture with a plurality of hold-down clips 442, as shown in FIGS. 28-29. The clips 442 can be configured to engage a perimeter of the deck plate 104 and the connecting members 416 and can be releasably secured to the connecting members 416, for example, by a plurality of fasteners. In other embodiments, the deck plate 104 can be releasably secured to the cambering fixture, for example, with a plurality of clamps (e.g., C-clamps) and/or other fasteners.

Cambering the cambering fixture 400 in the second direction can counteract the deck plate's tendency to curl around the ribs when the ribs 102 are welded to the deck plate 104. As a result, this produces a deck plate 104 that is flat in the second direction 432, thus reducing and/or eliminating the need to heat straighten the deck plate 104 after the ribs 102 are welded to the deck plate 104.

Figure 30:
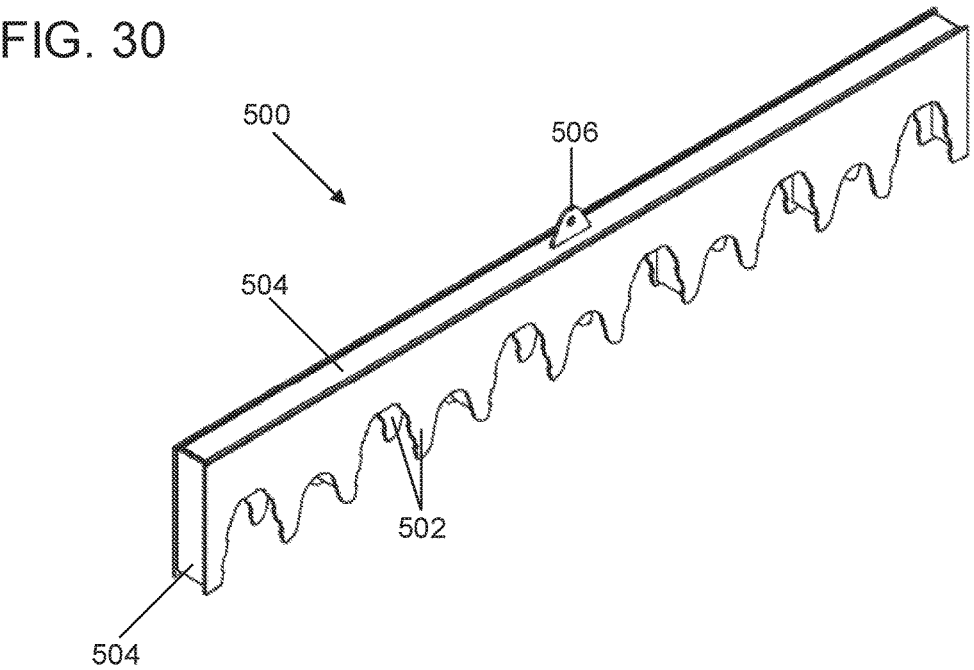
FIGS. 30-31 are various view of an exemplary embodiment of a rib fitting fixture.
Figure 31:
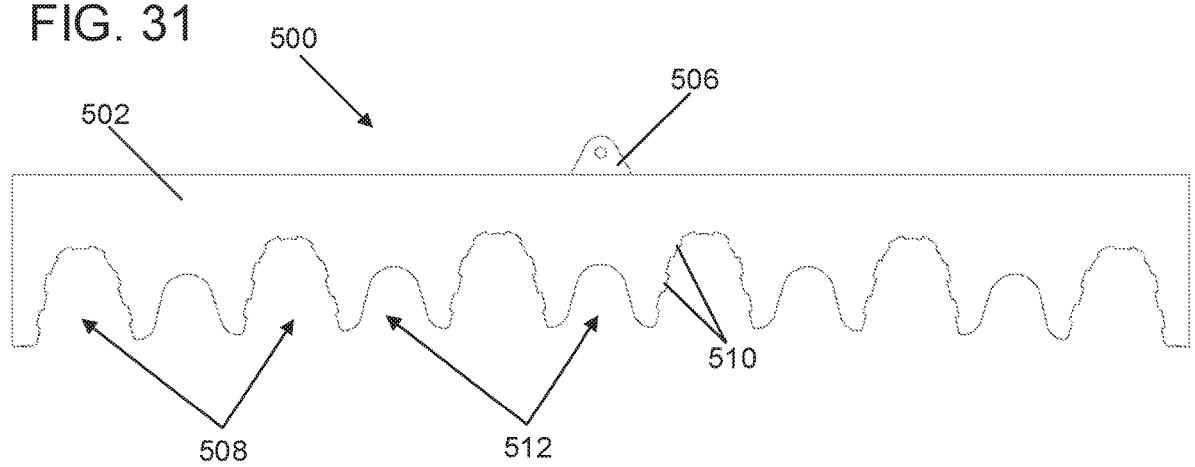
Figure 32:
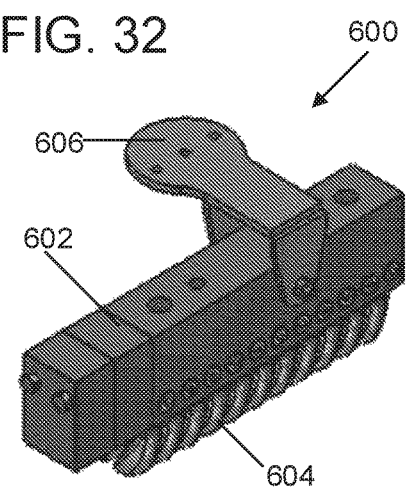
FIGS. 32-36 are various views of an exemplary embodiment of a grounding shoe assembly.
Figure 33:
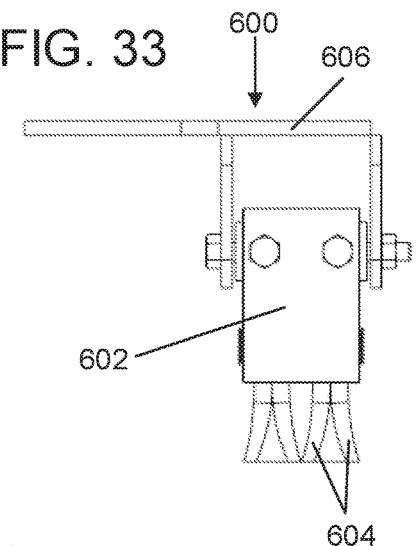

The ribs 102 can be attached to the cambered deck plate 104 using rib fitting fixtures 500 (only one shown for purposes of illustration) to hold the ribs 102 in the desired positions. As shown in FIGS. 30-31, the rib fitting fixtures 500 can each comprise web portions 502 (e.g., two in the illustrated embodiment), stiffening members 504, and a picking element 506. The web portions 502 can be spaced relative to each other, and the stiffening members 504 can be disposed between the web portions 502. The picking element 506 can be dispose on and coupled (e.g., welded and/or bolted) to a stiffening member 504.

The web portions 502 can comprise a plurality of rib openings 508 spaced relative to each other. The rib openings 508 can comprise a plurality of ridges 510 configured to engage the ribs 102 of the deck panel 100. In some embodiments, the web portions 502 can comprise a plurality of secondary openings 512 spaced relative to each other and disposed between the rib openings 508.

When attaching the ribs 102 to the deck plate 104, the rib fitting fixtures 500 can be disposed on and span across the ribs 102 to securely hold the ribs 102 to the deck plate 104. The rib fitting fixtures 500 can be spaced relative to each other and disposed on the ribs 102 at the locations that the floor beams 106 will be attached. In this manner, the rib fitting fixtures 500 can simulate the floor beams 106 the deck panel 100. Once the rib fitting fixtures 500 are desirable positioned, the ribs 102 can be attached (e.g., tack welded) to the deck plate 104. The rib fitting fixture 500 can then be removed, and the ribs 102 can be attached (e.g., robotically welded with a robotic welding apparatus) to the deck plate 104.

Figure 34:
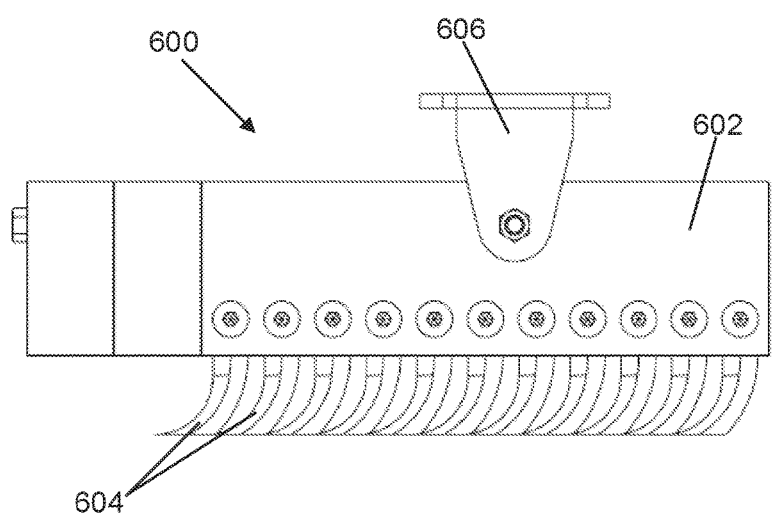
Figure 35:
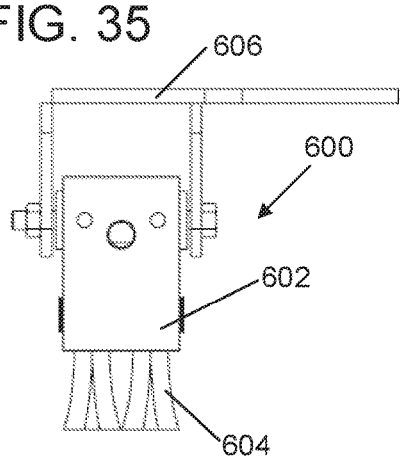
Figure 36:
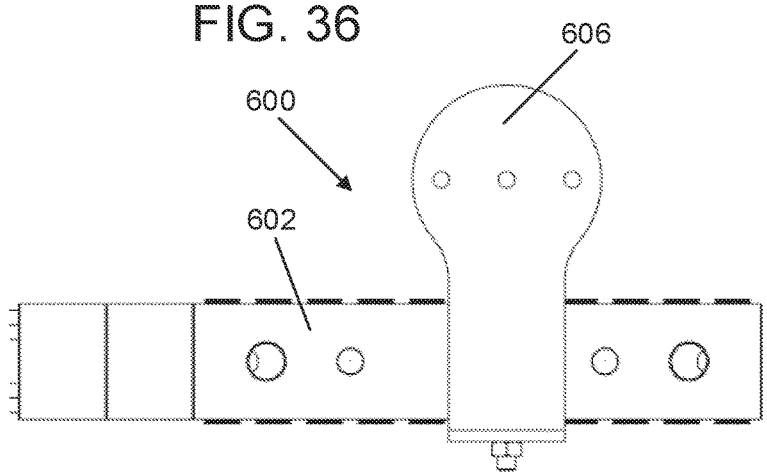

FIGS. 32-36 show an exemplary embodiment of a movable grounding shoe assembly 600. As best shown in FIG. 34, the grounding shoe assembly 600 can comprise a main body 602, a plurality of contacts 604, and a mounting bracket 606. The contacts 606 can extend from the main body 602 and can comprise a bristles formed from a conductive material such as copper. The mounting bracket 606 can be coupled to a robotic welder, and the contacts 604 can be movably coupled to the deck panel 100 (e.g., to the deck plate 104). The grounding shoe assembly 600 can be configured to move relative to and in contact with the deck panel 100 as the robotic welder moves along the rib 102 and the deck plate 104. This allows the distance and/or the positioning of the grounding shoe relative to the robotic welder to remain constant, or at least substantially constant, as the robotic welder moves along the rib 102 and the deck plate 104. As a result, the flow path of the electrical current flowing from the robotic welder, through the deck panel 100, and to the grounding shoe assembly 600 is relatively consistent and predictable. This advantageously produces more consistent and/or predictable welds than stationary grounding clamps or shoes where the relative distance and/or positioning between the grounding shoe and the robotic welder changes as the welder move along the deck panel.

Figure 37:
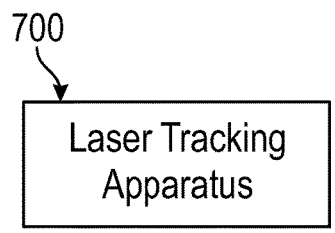
FIG. 37 is a schematic of a laser tracking apparatus.

A laser tracking apparatus 700 can then be used to measure and record profiles of the ribs 102 and the deck plate 104 at locations at which the floor beams 106 will be attached to the ribs 102 and the deck plate 104, as shown schematically in FIG. 37. For example, in some embodiments, the laser tracking apparatus 700 can be a FARO Vantage™ laser tracker manufactured by Faro Technologies, Inc. Corporation. Using this profile and a CNC machine, the floor beams 106 can be custom machined for their respective locations relative to the ribs 102 and the deck plate 104. For example, referring to FIG. 1, each of the 11 floor beams 106 can have a unique cut-out portion configured for the exact location to which the floor beam 106 will be attached relative to the ribs 102 and the deck plate 104. This can reduce tolerances between the floor beams 106, the ribs 102, and the deck plate 104 compared to decks in which the floor beams are cut from to a single, generic profile. As a result, the weld quality between the components is improved, thus improving the strength and/or durability of the deck panel 100.

The floor beams 106 can then be positioned at their respective locations relative to the ribs 102 and the deck plate 104 and attached to the ribs 102 and the deck plate 102. This can be accomplished by tack welding the floor beams 106 to the ribs 102 and the deck plate 104 with the deck panel 100 in a horizontal orientation, as shown in FIG. 2. The deck panel 100 can then be pivoted from the horizontal orientation to a vertical orientation, or in other words rotated 90 degrees about the longitudinal axis of the deck panel 100, as shown in FIG. 38

Figure 38:
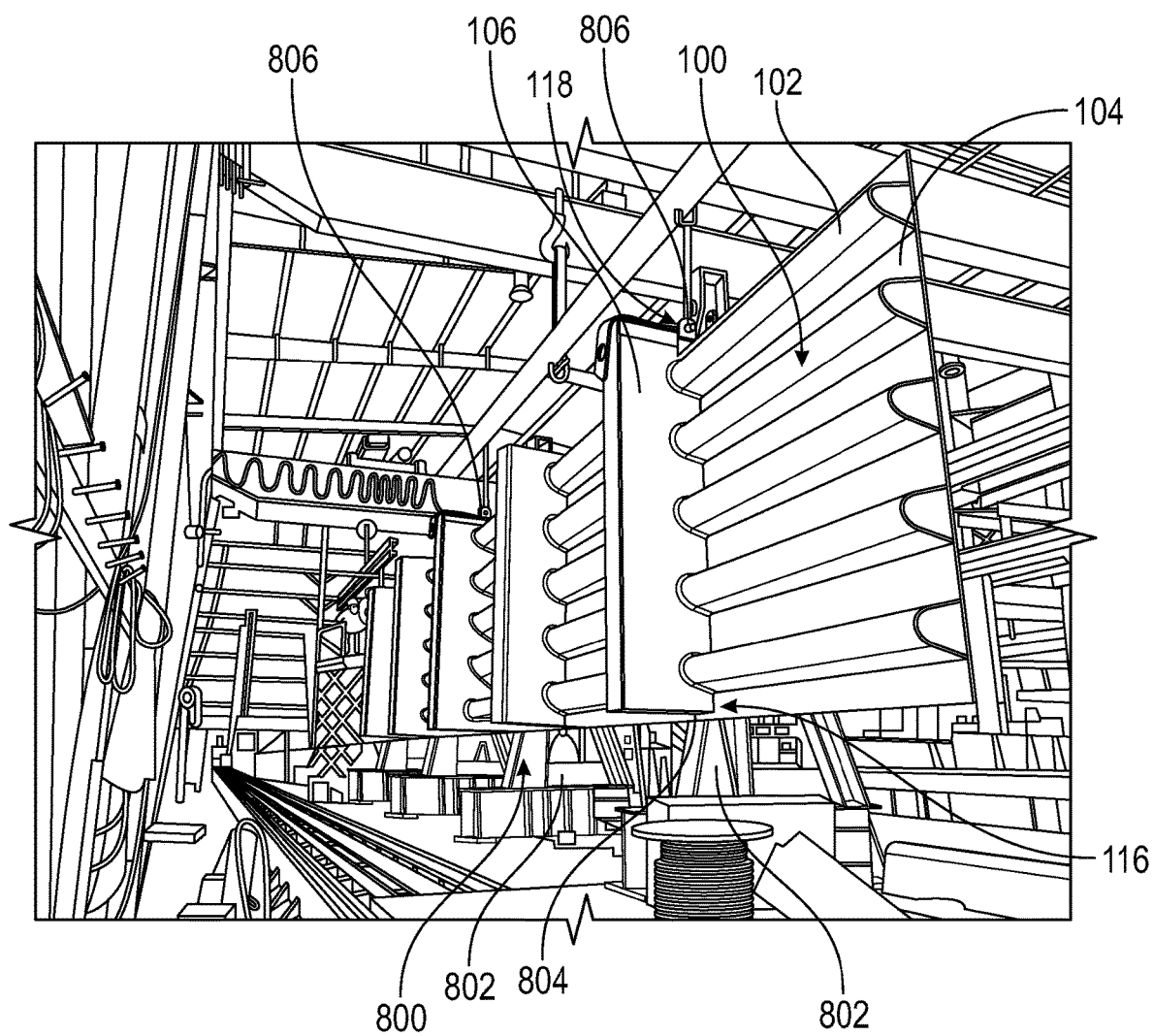
FIGS. 38-39 are various perspective views of an exemplary embodiment of a vertical welding fixture.

The deck panel 100 can then be attached to a vertical welding fixture 800, as shown in FIG. 38. The vertical welding fixture 800 can comprise a plurality of support stands 802, first attachment members 804, and second attachment members 806. The stands 802 can be spaced relative to each other. The first attachment members 804 can be lower attachment members disposed adjacent a first location 116 of the deck panel 100 and can be configured to releasably secure the deck panel 100 to the vertical welding fixture 800. The second attachment members 806 can be upper attachment members disposed adjacent a second location 118 of the deck panel 100 and can be configured to releasably secure the deck panel 100 to the vertical welding fixture 800.

Figure 39:
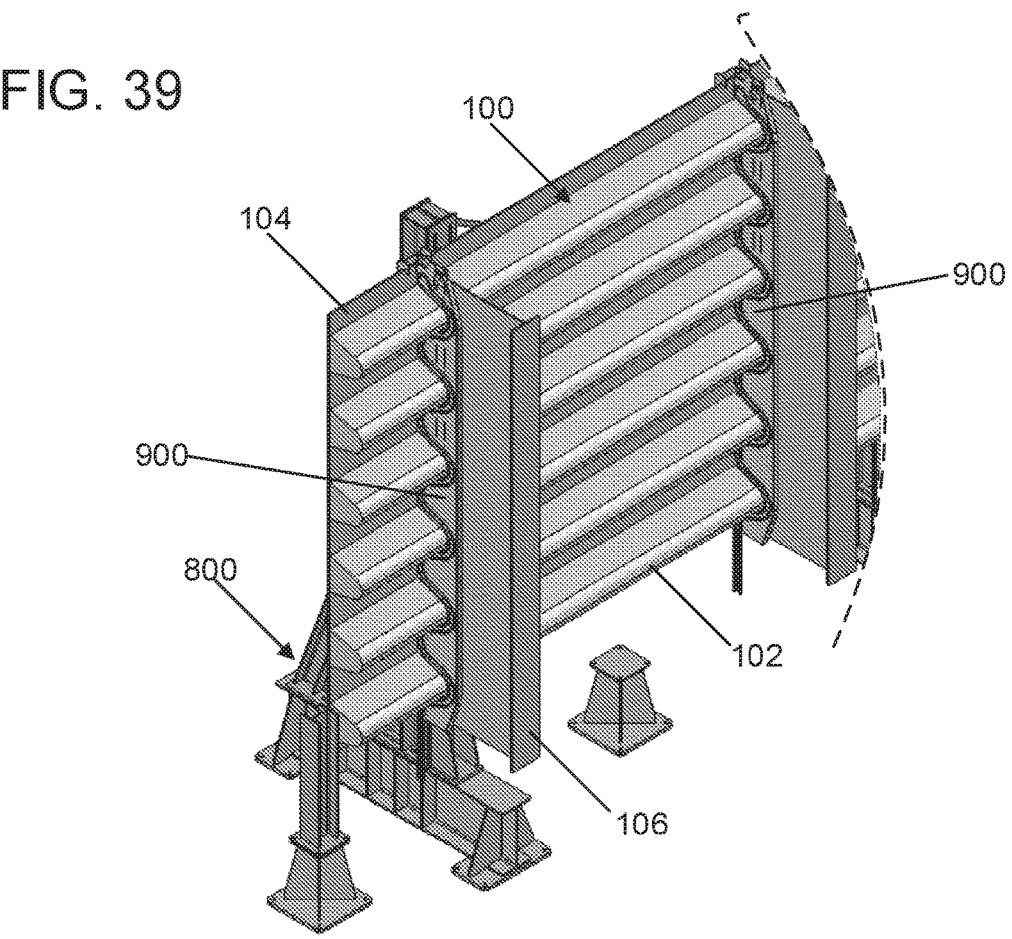
Figure 40:
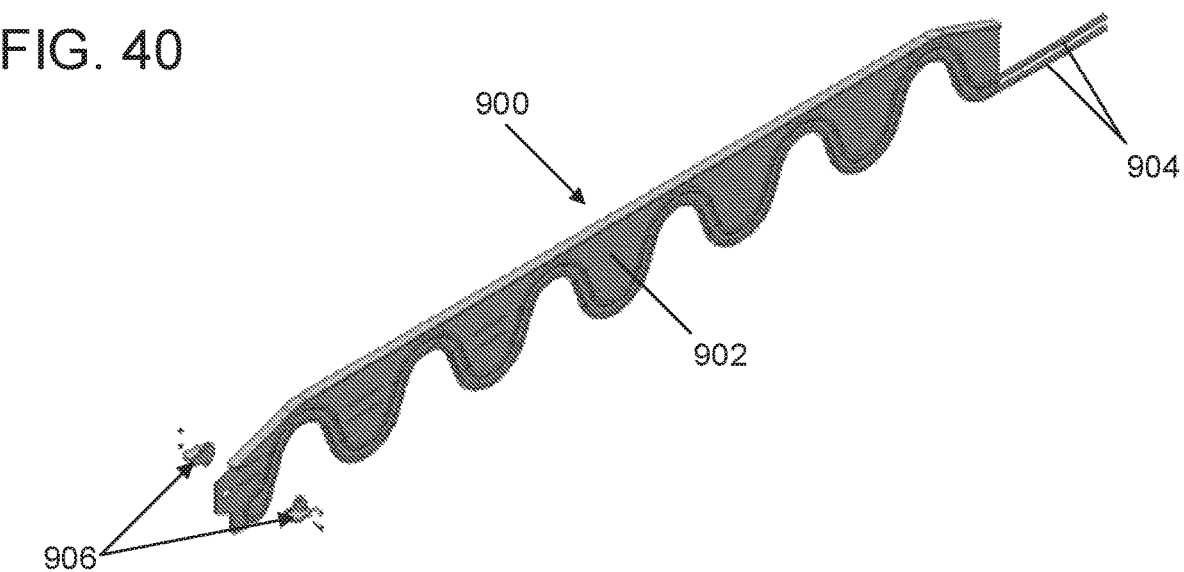
FIG. 40 is a perspective view of an exemplary embodiment of a pre-heating apparatus.

In some embodiments, the ribs 102, the deck plate 104, and the floor beams 106 can be pre-heated (e.g., by induction heaters) prior to welding the floor beams 106 to the ribs 102 and the deck plate 104. For example, FIGS. 39-40 show pre-heating apparatus 900 which can be used to pre-heat the ribs 102, the deck plate 104, and the floor beam 106. As best shown in FIG. 40, the pre-heating apparatus 900 can comprise a support plate 902, a plurality of heating cables 904, and a mounting bracket 906. The support plate 902 can be formed from a non-ferrous (e.g., non-magnetic) material and can have a plurality of undulating openings 908 configured to fit over the ribs 102 of the deck panel 100, as shown in FIG. 39. The heating cables 904 can be coupled to the support plate 902 adjacent the opening 908. As such, the pre-heating apparatus 900 can be disposed on the deck panel 100 as shown in FIG. 39 and can be used to pre-heat the rib member 102, the deck plate 104, and the floor beam 106 prior to welding the floor beam 106 to the rib member 102 and the deck plate 104.

It should be noted that pre-heating can be used for the various other welds that are described herein. For example, the ribs 102 and the deck plate 104 can be pre-heated prior to welding the ribs 102 to the deck plate 104, as described above.

With the deck panel 100 in the vertical orientation (e.g., FIGS. 39-40), a robotic welding apparatus can be used to weld the floor beams 106 to the ribs 102 and the deck plate 104. The vertical orientation of the deck panel 100 advantageously allows the weld direction to be vertically upward, and the robotic welding apparatus allows the weld to be continuous. For example, the robotic welding apparatus can begin at the first location 116 of the deck panel 100 (e.g., a bottom end as illustrated in FIG. 38) and move upwardly toward the second location 118 of the deck panel 100 (e.g., a top end as illustrated in FIG. 38), following the junction of the floor beams 106 and the ribs 102 and/or the deck plate 104, in a continuous weld. Welding the floor beams 106 to the ribs 102 and the deck plate 104 in this manner can improve the weld quality between the components compared to non-continuous and/or non-vertically upward welding. As a result, the strength and/or durability of the deck panel 100 can be improved.

Figure 41:
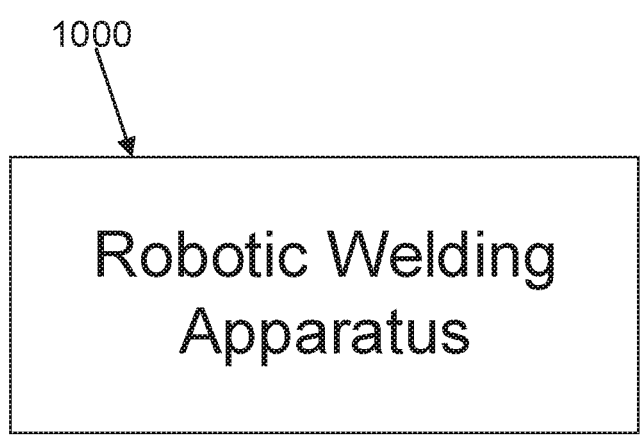
FIG. 41 is a schematic of a robotic welding apparatus.

As noted above, the ribs 102 and/or the floor beams 106 can be attached to the deck plate 104 and/or to each other by robotically welding the components together. This can be accomplished, for example, by welding the components with one or more robotic welding apparatus 1000, as shown schematically in FIG. 41.

Figure 42:
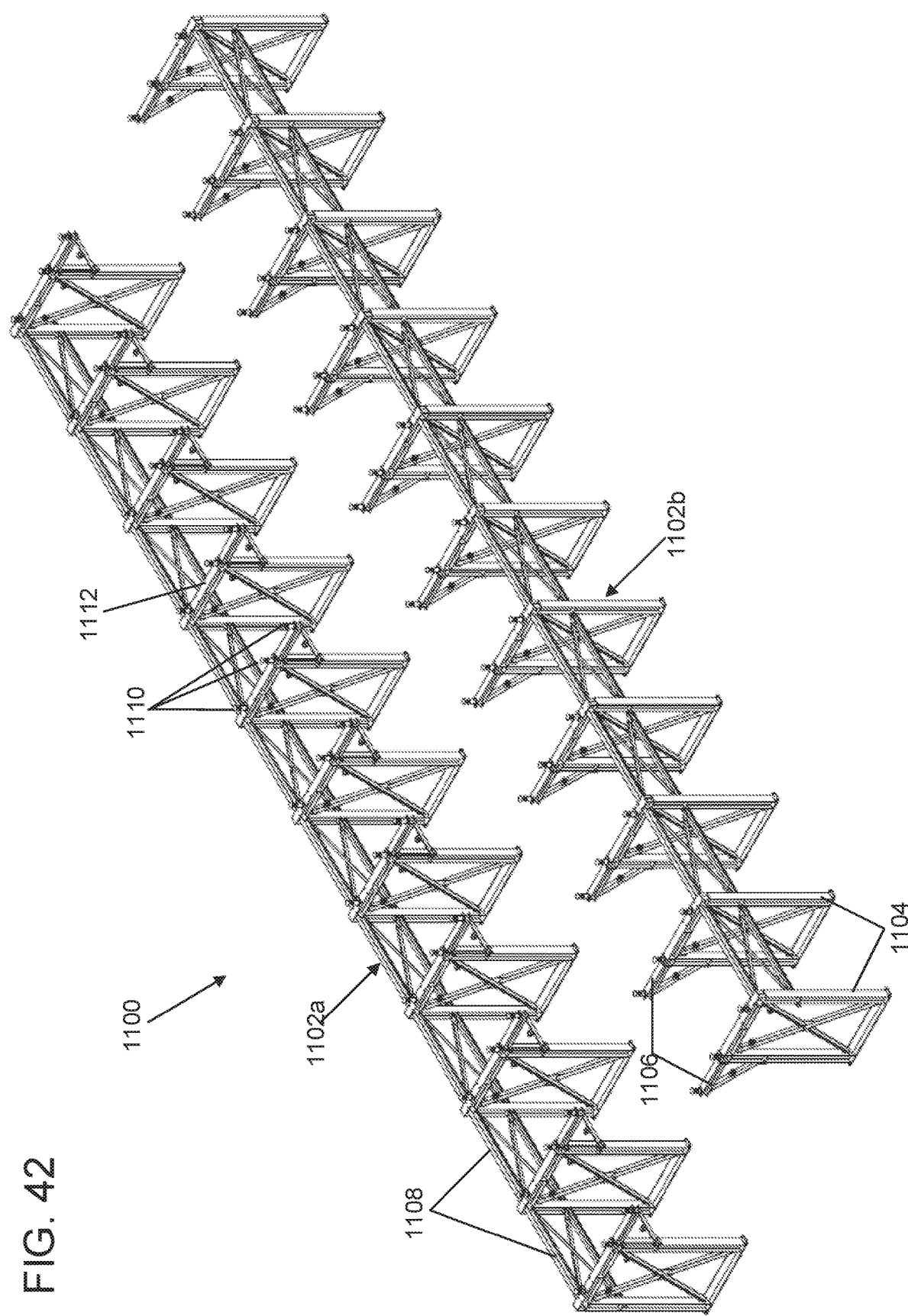
FIGS. 42-47 are various views of an exemplary embodiment of a deck support fixture and related components.
Figure 43:
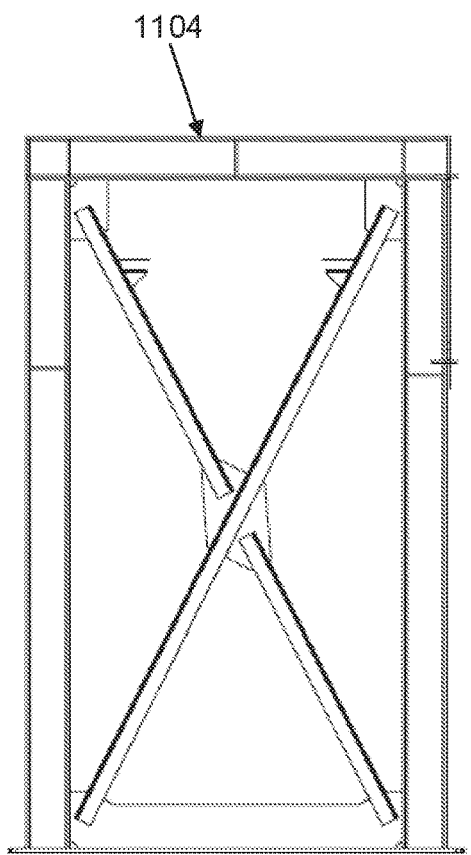
Figure 44:
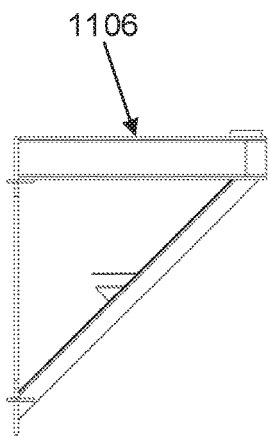
Figure 45:
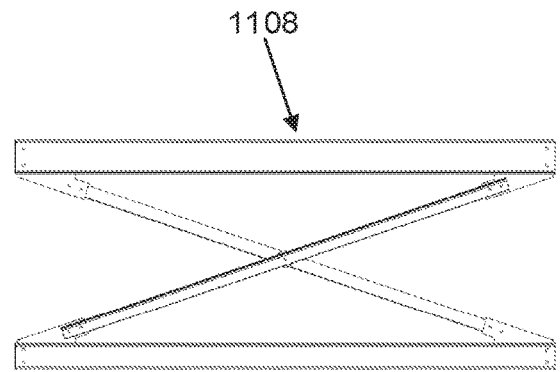

The deck panel 100 can be attached to a girder (e.g., the girder 1200, as shown in FIGS. 48-49) using a deck support fixture 1100, as shown in FIG. 42. The deck support fixture 1100 can comprise first and second support structures 1102a, 1102b (referred to collectively as "the support structures 1102") that can be spaced relative to each other. The support structures 1102 can comprise a plurality of main frames 1104, a plurality of secondary supports 1106, a plurality of lateral supports 1108, and a plurality of adjustment members 1110, as best shown in FIGS. 43-47. Referring again to FIG. 42, the secondary supports 1106 can be pivotably coupled to the main frames 1104, and the lateral supports 1108 can be fixedly secured to the main frames 1104. The adjustment mechanisms 1110 can be disposed on and removably coupled to first surfaces 1112 of the support structures 1102.

The deck support fixture 1100 can be configured such that the main frames 1104 and the secondary supports 1106 align with respective floor beams 106 of the deck panel 106. The support structures 1102 can be spaced relative to each other such that a girder can be position between the support structures 1102.

Figure 46:
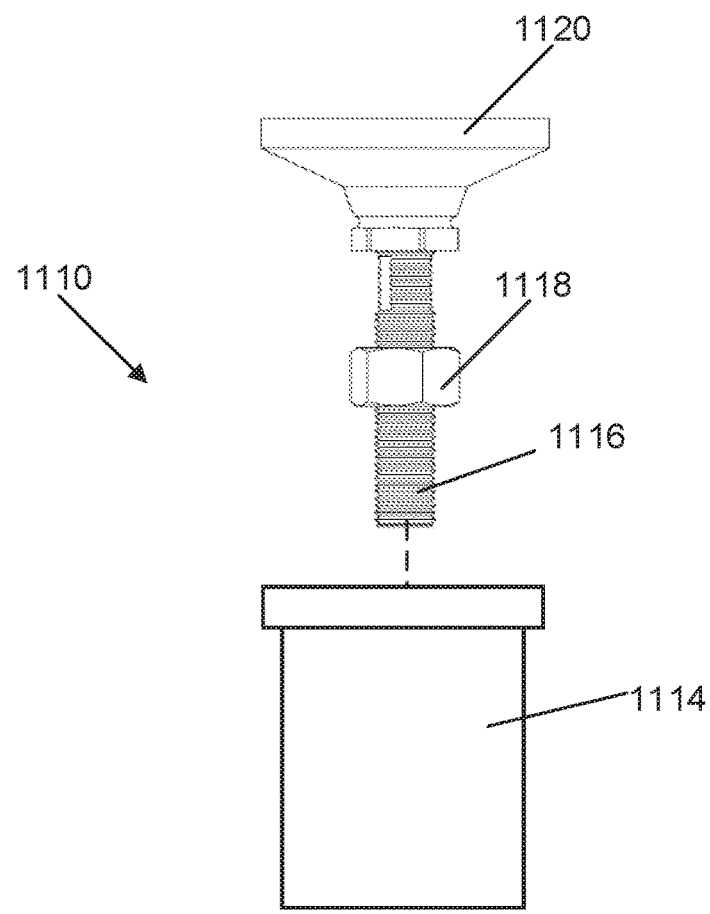
Figure 47:
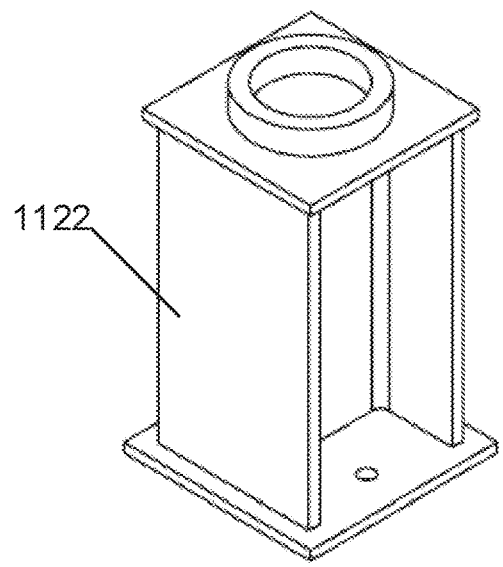

The adjustment mechanisms 1110 can be individually adjusted to accommodate camber relative to the box girder and/or tapered floor beams. Referring to FIG. 46, the adjustment mechanisms 1110 can each comprise a base portion 1114, a threaded portion 1116, a stopper member 1118, and a pad portion 1118, configured similar to a jack stand. As noted above, the base portions 1114 can be removably coupled to the first surfaces 1112 of the support structures 1102. The base portions 1114 can comprise various heights.

The threaded portions 1116 can comprise external threads configured to engage corresponding internal threads of respective base portions 1114. The pad portion 1120 can be coupled to the threaded portion 1116. As such, the height of the pad portion 1120 relative to the base portion 1114 can be adjusted by rotating the threaded portions 1116 in a first direction (e.g., counterclockwise) relative to the base portion 1114 to raise the pad portion 1120 relative to the base portion 1114 and by rotating the threaded portions 1116 in a second direction (e.g., clockwise) to lower the pad portion 1120 relative to the base portion 1114.

In some embodiments, the adjustment mechanisms 1110 can include pedestals 1122 which can be disposed between the first surface 1112 of the support structure 1102 and the base portion 1114 of the adjustment mechanisms 1110. The pedestal 1122 can comprise various heights.

In some embodiments, the deck support fixture 1110 can also comprise one or more lifting mechanisms (e.g., a hydraulic ram) configured to lift a deck panel relative to the deck support fixture 1110. This can make adjusting the adjustment members 1110 relatively easier.

In view of the many possible embodiments to which the principles of the disclosure may be applied, it should be recognized that the illustrated embodiments are only examples and should not be taken as limiting the scope of the invention. Rather, the scope of the invention is defined by the following claims. We therefore claim as our invention all that comes within the scope and spirit of these claims.

We claim:

1. A method of manufacturing an orthotropic deck panel, comprising:
    securing a rib member of an orthotropic deck panel in a first fixture, wherein the rib member includes a first end, a second end, and a plurality of edge portions extending longitudinally between the first end and the second end, wherein the edge portions are spaced apart from each other in a transverse direction;
    beveling outwardly facing surfaces of the edge portions while the rib member is secured in the first fixture;
    releasing the rib member from the first fixture;
    securing the edge portions of the rib member against a deck plate with a plurality of second fixtures spaced longitudinally relative to each other and distributed along the rib member between the first end and the second end of the rib member;
    attaching the rib member to the deck plate of the orthotropic deck panel by welding the rib member to the deck plate along the beveled outwardly facing surfaces of the edge portions while the rib member is secured against the deck plate with the second fixtures; and
    attaching a floor beam of the orthotropic deck panel to the rib member and the deck plate.

2. The method of claim 1, further comprising cambering the deck plate in a first direction and in a second direction using a third fixture prior to the act of attaching the edge portions of the rib member to the deck plate, wherein the second direction is transverse to the first direction, wherein the deck plate remains cambered in the first direction after the rib member is attached to the deck plate and after the deck plate is removed from the third fixture, and wherein the deck plate is flat in the second direction after the rib member is attached to the deck plate and after the deck plate is removed from the third fixture.

3. The method of claim 1, further comprising:
    creating a profile of the rib member and the deck plate at a longitudinal location along the rib member and the deck plate; and
    cutting the floor beam to match the profile at the longitudinal location along the rib member and the deck plate,
    wherein the acts of creating the profile and cutting the floor beam occur prior to the act of attaching the floor beam.

4. The method of claim 3, wherein the profile of the rib member and the deck plate is created using laser tracking.

5. The method of claim 1, wherein attaching the floor beam comprises tack welding the floor beam to the rib member and the deck plate while the orthotropic deck panel is in a first orientation, pivoting the orthotropic deck panel from the first orientation to a second orientation orthogonal to the first orientation, and welding the floor beam to the rib member and the deck plate in continuous weld while the orthotropic deck panel is in the second orientation.

6. The method of claim 1, wherein the outwardly facing surfaces of the edge portions of the rib member are beveled by machining the edge portions of the rib member.

7. A method of manufacturing an orthotropic deck panel, comprising:
    securing a rib member of an orthotropic deck panel in a first fixture such that edge portions of the rib member are exposed from the first fixture;
    beveling outwardly facing surfaces of the edge portions while the rib member is secured in the first fixture;
    releasing the rib member from the first fixture;
    securing a deck plate of the orthotropic deck panel against a second fixture and cambering the deck plate in a transverse direction; and
    attaching the edge portions of the rib member to the deck plate while the deck plate is secured against the second fixture.

8. The method of claim 7, wherein the act of attaching the edge portions of the rib member to the deck plate includes welding along the outwardly facing surfaces of the edge portions.

9. The method of claim 7, wherein the act of beveling the outwardly facing surfaces of the edge portions includes milling the edge portions.

10. The method of claim 7, wherein prior to the act of attaching the edge portions of the rib member to the deck plate, the method further comprises machining flat surfaces on the edge portions, wherein each flat surface is adjacent a respective beveled outwardly facing surface.

11. The method of claim 10, wherein prior to the act of attaching the edge portions of the rib member to the deck plate, a root gap between the rib member and the deck plate is less than or equal to 0.010 inches.

12. The method of claim 7, wherein prior to the act of attaching the edge portions of the rib member to the deck plate, the method further comprises securing the edge portions of the rib member against the deck plate by a plurality of third fixtures, wherein the third fixtures are spaced relative to each other in a longitudinal direction, wherein each of the third fixtures comprises a rib opening configured for receiving the rib member, and wherein the rib opening is defined by a surface configured to engage the rib member.

13. The method of claim 7, wherein the act of securing the rib member in the first fixture includes placing the rib member within a rib receiving member of the first fixture and clamping the rib member against an interior surface of the rib receiving member with a mandrel of the first fixture and a wedge plate of the first fixture, wherein the edge portions of the rib member extend away from the rib receiving member and the wedge plate of the first fixture.

14. The method of claim 13, wherein clamping the rib member against an interior surface of the rib receiving member includes actuating a hydraulic ram coupled to the mandrel and configured for moving the mandrel relative to the rib receiving member.

15. The method of claim 13, wherein the interior surface of the rib receiving member comprises a plurality of projections disposed on first and second sides of the interior surface, wherein the projections are configured to contact the rib member at a location spaced apart from the edge portions while the rib member is secured relative to the first fixture.

16. The method of claim 13, wherein the interior surface of the rib receiving member comprises an interior plate disposed between first and second sides of the interior surface, and wherein the interior plate includes a plurality of angled surfaces configured to contact the rib member while the rib member is secured relative to the first fixture.

17. A method of manufacturing an orthotropic deck panel, comprising:
positioning a rib member of an orthotropic deck panel within a first fixture, wherein the rib member includes a first longitudinally-extending edge portion and a second longitudinally-extending edge portion, the first and second edge portions being spaced apart in a transverse direction;
securing the rib member relative to the first fixture by clamping the first and second edge portions of the rib member between a first member and a second member of the first fixture, wherein the first and second edge portions of the rib member are exposed from the first and second members of the first fixture;
machining the first and second edge portions of the rib member such that the first and second edge portions comprise beveled portions;
releasing the rib member from the first fixture;
positioning the beveled portions of the first and second edge portions adjacent a deck plate of the orthotropic deck panel;
cambering the deck plate in a longitudinal direction to a first degree of camber, wherein the longitudinal direction is orthogonal to the transverse direction;
cambering the deck plate in the transverse direction to a second degree of camber; and
attaching the rib member to the deck plate by welding along the beveled portions of the first and second edge portions,
wherein the first degree of camber in the longitudinal direction corresponds to a shape of a surface of which the orthotropic deck panel is a part, and
wherein the second degree of camber in the transverse direction is configured such that the deck plate is flatter in the transverse direction after the rib member is welded to the deck plate than when the deck plate is being cambered in the transverse direction.

18. The method of claim 17, wherein positioning the beveled portions of the first and second edge portions adjacent the deck plate further comprises securing the first and second edge portions against the deck plate with a plurality of second fixtures spaced longitudinally relative to each other in the longitudinal direction.

19. The method of claim 17, further comprising positioning the orthotropic deck panel in a first orientation;
welding a floor beam to the rib member and the deck plate while the orthotropic deck panel is in the first orientation;
positioning the orthotropic deck panel from the first orientation to a second orientation orthogonal to the first orientation; and
welding the floor beam to the rib member and the deck plate while the orthotropic deck panel is in the second orientation.

20. The method of claim 19, wherein prior to the act of welding the floor beam to the rib member and the deck plate, the method further comprises:
creating a profile of the rib member and the deck plate at a longitudinal location along the rib member and the deck plate; and
cutting the floor beam to match the profile of the rib member and the deck plate at the longitudinal location along the rib member and the deck plate.

* * * * *